(12) United States Patent
Tanaka

(10) Patent No.: US 11,504,598 B2
(45) Date of Patent: Nov. 22, 2022

(54) GOLF ANALYSIS ASSISTANCE APPARATUS, GOLF ANALYSIS ASSISTANCE METHOD, AND NON-VOLATILE COMPUTER-READABLE STORAGE MEDIUM STORING GOLF ANALYSIS ASSISTANCE PROGRAM

(71) Applicant: Kota Tanaka, Higashi-Osaka (JP)

(72) Inventor: Kota Tanaka, Higashi-Osaka (JP)

( * ) Notice: Subject to any disclaimer, the term of this patent is extended or adjusted under 35 U.S.C. 154(b) by 0 days.

(21) Appl. No.: 17/546,361

(22) Filed: Dec. 9, 2021

(65) Prior Publication Data

US 2022/0118341 A1 Apr. 21, 2022

Related U.S. Application Data

(63) Continuation of application No. PCT/JP2021/026530, filed on Jul. 14, 2021.

(30) Foreign Application Priority Data

Jul. 15, 2020 (JP) .............................. JP2020-121519

(51) Int. Cl.
*A63B 71/06* (2006.01)

(52) U.S. Cl.
CPC ...... *A63B 71/0669* (2013.01); *A63B 71/0605* (2013.01); *A63B 71/0622* (2013.01); *A63B 2071/0691* (2013.01); *A63B 2220/76* (2013.01)

(58) Field of Classification Search
CPC ............ A63B 71/0669; A63B 71/0605; A63B 71/0622; A63B 2071/0691; A63B 2220/76; A63B 69/36; A63B 24/0003
See application file for complete search history.

(56) References Cited

U.S. PATENT DOCUMENTS

| 10,682,562 | B2* | 6/2020 | Syed .................. A63B 71/0669 |
| 2002/0082775 | A1* | 6/2002 | Meadows ............... G01S 19/42 |
| | | | 701/472 |
| 2002/0099457 | A1* | 7/2002 | Fredlund ................ A63B 57/00 |
| | | | 700/91 |
| 2002/0143729 | A1* | 10/2002 | Fostick ................... G06F 16/29 |

(Continued)

FOREIGN PATENT DOCUMENTS

| JP | 2001-346930 A | 12/2001 |
| JP | 2003-190352 A | 7/2003 |

(Continued)

OTHER PUBLICATIONS

Written Opinion of the International Searching Authority, issed in PCT/JP2021/026530, dated Sep. 28, 2021.

(Continued)

*Primary Examiner* — Michael D Dennis
(74) *Attorney, Agent, or Firm* — Birch, Stewart, Kolasch & Birch, LLP

(57) ABSTRACT

A golf analysis assistance apparatus includes an input/output unit, a golf course data storage unit, a player data storage unit, a target score acquisition unit configured to acquire a target score throughout a course, the target score being set by a player, and a control unit. The control unit is configured to obtain an optimal solution at each hole that enables achievement of the target score throughout the course, the target score being set by the player, based on golf course data and player data.

8 Claims, 16 Drawing Sheets

(56) References Cited

U.S. PATENT DOCUMENTS

| | | | |
|---|---|---|---|
| 2002/0161461 A1* | 10/2002 | Lobb | A63B 24/0021 |
| | | | 700/91 |
| 2003/0191547 A1* | 10/2003 | Morse | A63B 24/0021 |
| | | | 700/91 |
| 2005/0227791 A1* | 10/2005 | McCreary | A63B 69/3658 |
| | | | 473/407 |
| 2007/0167247 A1* | 7/2007 | Lindsay | G01S 17/58 |
| | | | 473/131 |
| 2009/0082139 A1 | 3/2009 | Hart | |
| 2010/0174480 A1 | 7/2010 | Trenkle et al. | |
| 2013/0196792 A1 | 8/2013 | Shimizu et al. | |
| 2015/0126308 A1* | 5/2015 | Penn | A63B 69/3605 |
| | | | 473/407 |

FOREIGN PATENT DOCUMENTS

| | | | |
|---|---|---|---|
| JP | 2013-154177 A | 8/2013 |
| JP | 5848489 B1 | 1/2016 |
| JP | 2016-32580 A | 3/2016 |
| JP | 2016-202869 A | 12/2016 |
| JP | 2017-99905 A | 6/2017 |
| JP | 2018-11992 A | 1/2018 |
| JP | 2019-146927 A | 9/2019 |
| JP | 2020-65833 A | 4/2020 |

OTHER PUBLICATIONS

Written Opinion of the International Searching Authority (PCT/ISA/237) issued in PCT/JP2021/026530, dated Jan. 2015.

* cited by examiner

Fig.3

| OUT | | SHOT | | PUTT | | | | | | | PAR |
|---|---|---|---|---|---|---|---|---|---|---|---|
| HOLE | WHITE TEE | PERSONAL PAR | RESULT | PERSONAL PAR | RESULT | | | | | | |
| 1 | 364 | 5 | | 2 | | | | | | | 4 |
| 2 | 517 | 5 | | 2 | | | | | | | 5 |
| 3 | 354 | 4 | | 2 | | | | | | | 4 |
| 4 | 152 | 2 | | 2 | | | | | | | 3 |
| 5 | 365 | 3 | | 2 | | | | | | | 4 |
| 6 | 358 | 3 | | 2 | | | | | | | 4 |
| 7 | 152 | 2 | | 2 | | | | | | | 3 |
| 8 | 526 | 4 | | 2 | | | | | | | 5 |
| 9 | 376 | 4 | | 2 | | | | | | | 4 |
| TOTAL | 3164 | 32 | | 18 | | | | | | | 36 |

| IN | | SHOT | | PUTT | | | | | | | PAR |
|---|---|---|---|---|---|---|---|---|---|---|---|
| HOLE | WHITE TEE | PERSONAL PAR | RESULT | PERSONAL PAR | RESULT | | | | | | |
| 10 | 401 | 4 | | 2 | | | | | | | 4 |
| 11 | 494 | 4 | | 2 | | | | | | | 5 |
| 12 | 346 | 3 | | 2 | | | | | | | 4 |
| 13 | 356 | 4 | | 2 | | | | | | | 4 |
| 14 | 149 | 2 | | 2 | | | | | | | 3 |
| 15 | 376 | 3 | | 2 | | | | | | | 4 |
| 16 | 154 | 2 | | 2 | | | | | | | 3 |
| 17 | 367 | 4 | | 2 | | | | | | | 4 |
| 18 | 511 | 5 | | 2 | | | | | | | 5 |
| TOTAL | 3154 | 31 | | 18 | | | | | | | 36 |

Fig.6
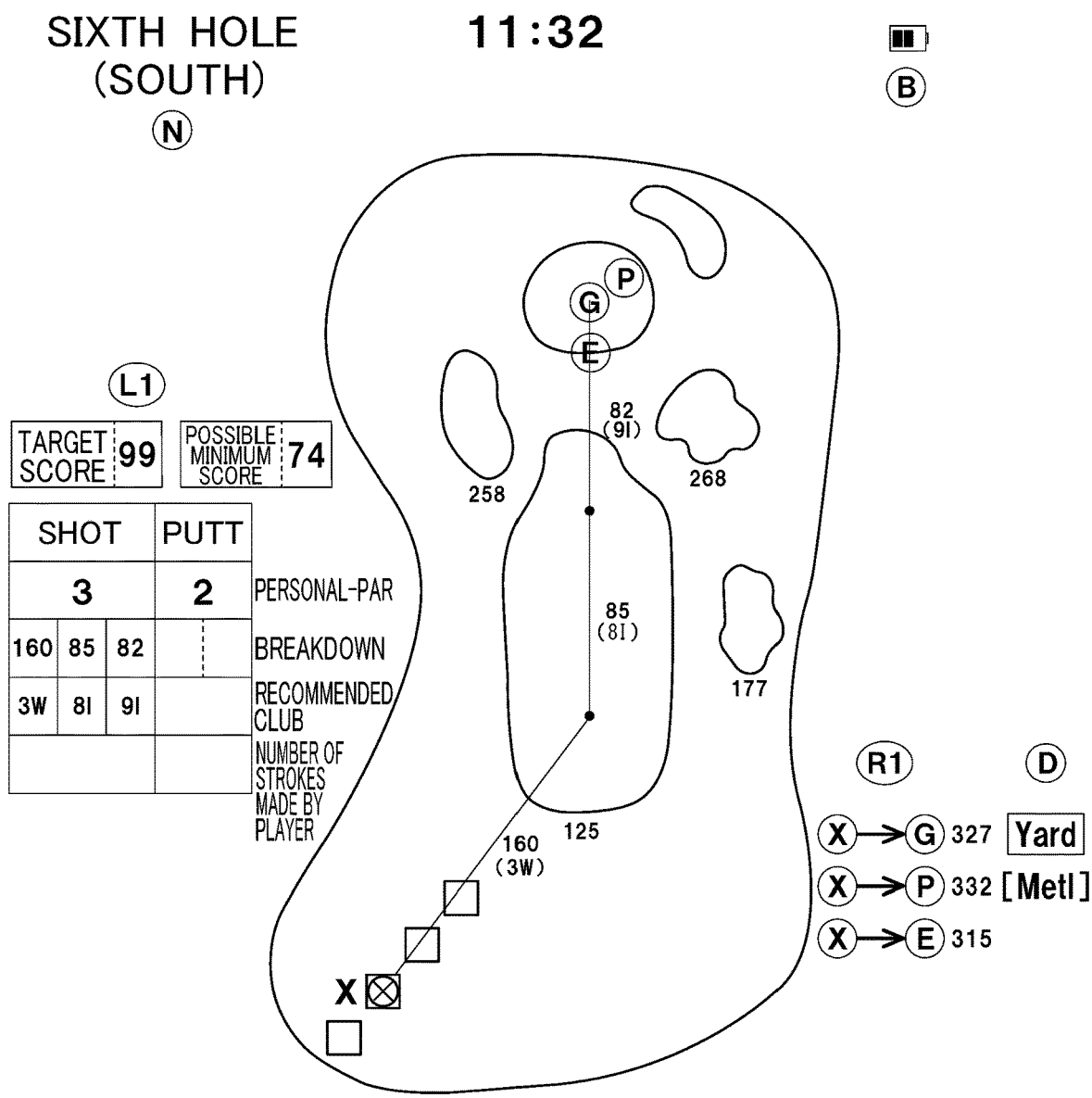
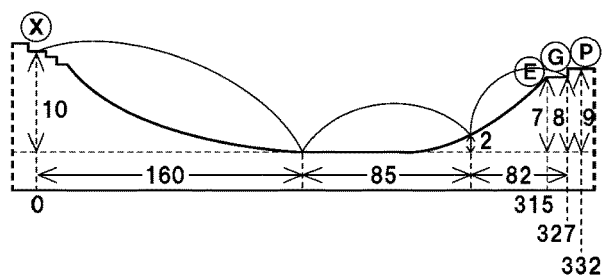

Fig.8

| CLUB | HS(m/s) | THEORETICAL CARRY | AVERAGE CARRY | ALIENATION RATE | SUCCESS RATE | FREQUENCY OF USE |
|---|---|---|---|---|---|---|
| 1W | 32 | 178 | 145 | 19% | 10% | 2% |
| 2W | – | – | – | – | – | – |
| 3W | – | 163 | 160 | 2% | 58% | 18% |
| 4W | – | – | – | – | – | – |
| 5W | – | 153 | – | – | – | 0% |
| 7W | – | – | – | – | – | – |
| 3UT | – | 146 | – | – | – | 0% |
| 4UT | – | – | – | – | – | – |
| 5UT | – | 135 | – | – | – | 0% |
| 6UT | – | – | – | – | – | – |
| 3I | – | – | – | – | – | – |
| 4I | – | – | – | – | – | – |
| 5I | – | 126 | – | – | – | 0% |
| 6I | – | 117 | – | – | – | 0% |
| 7I | – | 108 | 85 | 21% | 49% | 11% |
| 8I | – | 99 | 85 | 15% | 72% | 11% |
| 9I | – | 91 | 82 | 10% | 81% | 11% |
| PW | – | 82 | 75 | 9% | 83% | 12% |
| PS | – | 71 | 64 | 10% | 80% | 15% |
| SW | – | 57 | 53 | 7% | 85% | 20% |

Fig.9

| HOLE | ALIENATION FROM PAR | ORDER OF VARIANCE | ALIENATION FROM PERSONAL-PAR FOR SHOTS | ORDER OF VARIANCE |
|---|---|---|---|---|
| 1 | 1.5 | 9 | −0.5 | 16 |
| 2 | 2.4 | 1 | 1.1 | 2 |
| 3 | 1.8 | 5 | 0.7 | 4 |
| 4 | 1.2 | 17 | 0.1 | 11 |
| 5 | 1.4 | 13 | 0.3 | 7 |
| 6 | 1.6 | 7 | −0.4 | 15 |
| 7 | 1.5 | 9 | 0.6 | 5 |
| 8 | 2.2 | 2 | 1.2 | 1 |
| 9 | 1.4 | 13 | −1.1 | 18 |
| 10 | 2.1 | 3 | 0.3 | 7 |
| 11 | 2.1 | 3 | 0.8 | 3 |
| 12 | 1.4 | 13 | 0.5 | 6 |
| 13 | 1.6 | 7 | 0.3 | 7 |
| 14 | 1.2 | 17 | 0.1 | 11 |
| 15 | 1.5 | 9 | 0.2 | 10 |
| 16 | 1.3 | 16 | 0 | 14 |
| 17 | 1.5 | 9 | 0.1 | 11 |
| 18 | 1.8 | 5 | −0.6 | 17 |

Fig.10
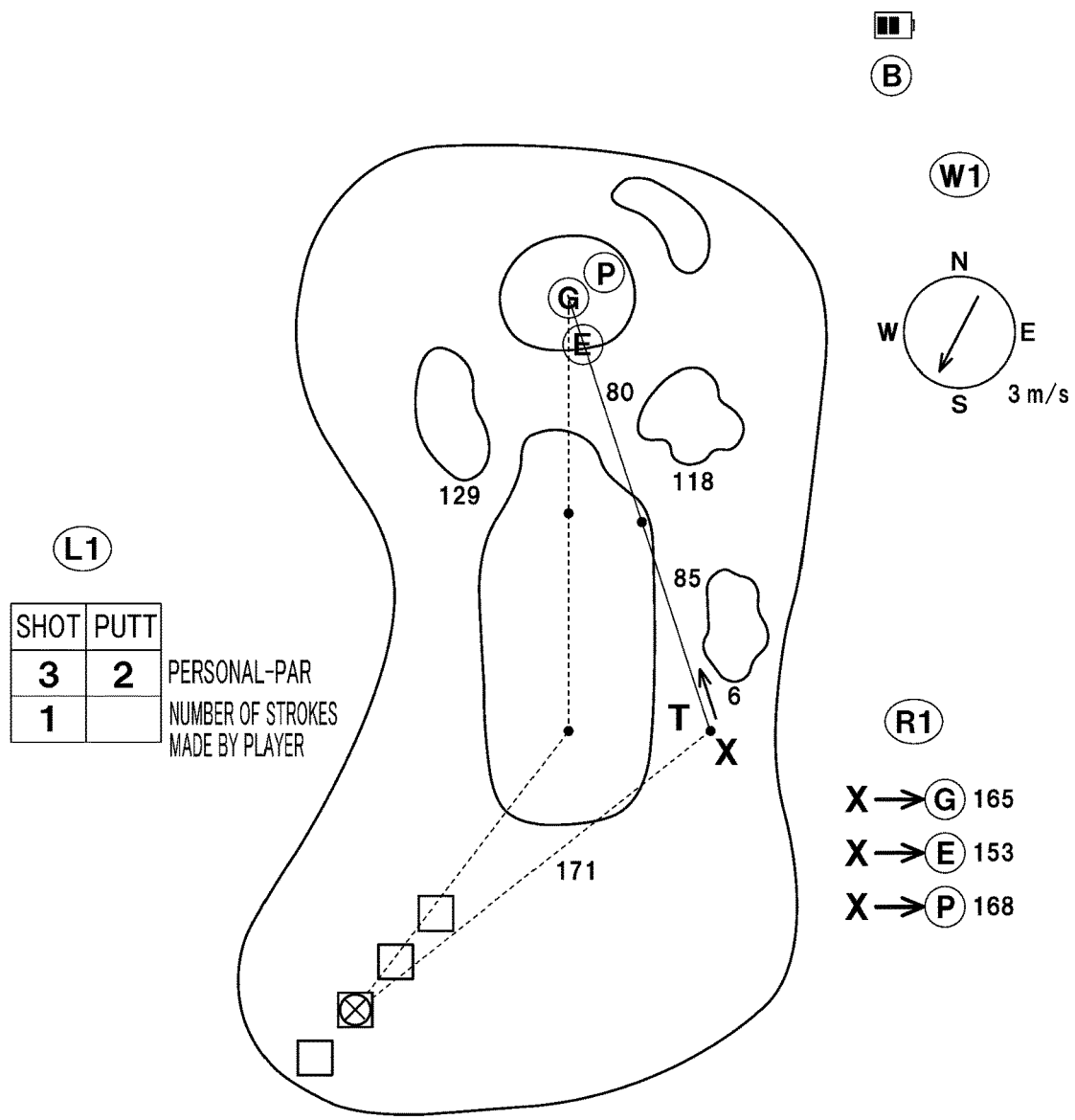
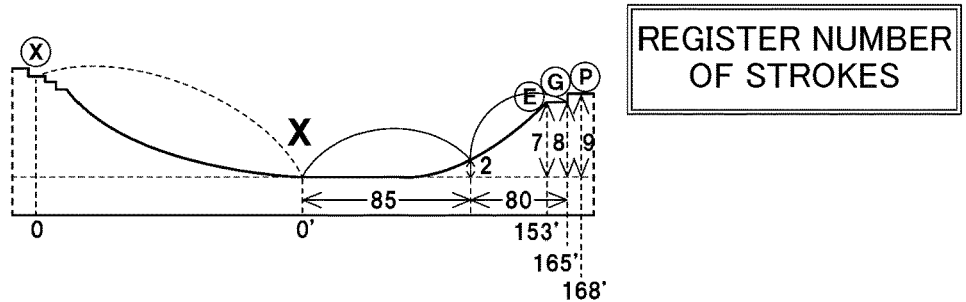

Fig.12

| HOLE | 1 | 2 | 3 | 4 | 5 | 6 | 7 | 8 | 9 | 10 | 11 | 12 | 13 | 14 | 15 | 16 | 17 | 18 | Result |
|---|---|---|---|---|---|---|---|---|---|---|---|---|---|---|---|---|---|---|---|
| PERSONAL-PAR | — | — | ○ | | | | | | | | | | | | | | | | |
| PLAYER | — | — | | ○ | ○ | | | | | | | | | | | | | | 1UP |

Fig.14

| COURSE | TARGET SCORE | BETTER-PERSONAL-PAR | REDUNDANCY | DEGREE OF EASINESS FOR ACHIEVEMENT |
|---|---|---|---|---|
| A | 99 | 89 | 10 | 2 |
| B | 99 | 95 | 4 | 3 |
| C | 99 | 83 | 16 | 1 |

GOLF ANALYSIS ASSISTANCE APPARATUS, GOLF ANALYSIS ASSISTANCE METHOD, AND NON-VOLATILE COMPUTER-READABLE STORAGE MEDIUM STORING GOLF ANALYSIS ASSISTANCE PROGRAM

CROSS REFERENCE TO RELATED APPLICATIONS

This application is a continuation application of International Application No. PCT/JP2021/026530, filed on Jul. 14, 2021, which claims the benefit of priority to Japanese Patent Application No. 2020-121519, filed on Jul. 15, 2020. The entire contents of each of these applications are hereby incorporated herein by reference.

TECHNICAL FIELD

The present invention relates to a golf analysis assistance apparatus, a golf analysis assistance method, and a non-volatile computer-readable storage medium storing a golf analysis assistance program.

BACKGROUND ART

Known is a golf assistance apparatus utilizing a global positioning system (GPS) receiver that displays a distance from a present position to a green, a bunker, or the like, and a course layout, and that is capable of recording a hitting position of a ball precisely and simply during golf play in a golf course.

For example, a navigator apparatus described in "Japanese Unexamined Patent Application Publication No. 2001-346930" (Patent Literature 1) allows a player to know an optimal stroke direction in accordance with his/her individual skill by selecting and operating a switching key for checking a stroke direction with a carry in accordance with the player's stroke skill.

A golf navigation system described in "Japanese Patent No. 5848489" (Patent Literature 2) calculates a remaining distance to a pin during golf play, and instantly presents a recommended golf club.

CITATION LIST

Patent Literature

[PTL 1] "Japanese Unexamined Patent Application Publication No. 2001-346930"
[PTL 2] "Japanese Patent No. 5848489"

SUMMARY

Technical Problem

A golf player plays golf by setting a target such as "I will break a score of 100 today!", and achievement of the target adds greatly to his/her joy.

The conventional golf assistance apparatuses according to Patent Literatures 1 and 2 are capable of presenting a conquering method at an individual hole in accordance with the player's skill, but fail to present a conquering method at each hole to achieve "a target score of 99" throughout a course as the target of "I will break the score of 100 today!" set by the player himself/herself.

The present invention is directed to provision of an assistance apparatus that derives and presents before play, in accordance with "a target score throughout a course" desired by a golf player (hereinafter simply referred to as a "player" or a "user") himself/herself, "an optimal number of strokes at each hole" for achieving this target (hereinafter referred to as an "optimal solution", and an optimal route in each course for achieving the "optimal solution" is hereinafter referred to as an "optimal solution route").

In addition, the present invention is also directed to provision of the assistance apparatus that corrects and presents the derived optimal solution and optimal solution route during play.

Solution to Problem

To achieve the above-mentioned purpose, the following measures are taken in the present invention.

That is, a golf analysis assistance apparatus according to the present invention includes an input/output unit, a golf course data storage unit which stores attribute data of a golf course, a player data storage unit which stores attribute data of a player, a target score acquisition unit to acquire a target score on the entire golf course, the target score being set by the player, and a control unit configured or programmed to control the input/output unit, the golf course data storage unit, the player data storage unit, and the target score acquisition unit. The attribute data of the golf course includes two-dimensional layout information and three-dimensional layout information of the golf course and positional information of one or more objects on the golf course including a green and/or a hazard. The attribute data of the player includes data regarding a carry obtained using each of golf clubs for use by the player and head speed of each of the golf clubs and content of previous play of the player. The control unit is configured or programmed to (i) based on the target score acquired by the target score acquisition unit, the attribute data in the golf course data storage unit, and the attribute data in the player data storage unit, determine an optimal solution for the player on each of holes from a tee shot to a final putt and a route to the optimal solution from the tee shot to the final putt so that the target score is achieved and (ii) output the optimal solution and the route to the optimum solution to the input/output unit. The optimal solution is a subtotal of the number of shots to reach the green and the number of putts on the green on each of the holes determined based on the attribute data in the golf course data storage unit and the attribute data in the player data storage unit so that the sum of the subtotals on the holes matches the target score. The route to the optimal solution is comprised of a route including presenting a recommended type of golf club and a carry obtained using the recommended type of golf club for achieving the number of shots.

The golf analysis assistance further includes a weather data acquisition unit to acquire weather data regarding a wind direction and/or a wind speed in the golf course, a number-of-strokes registration unit to register the number of strokes, and a GPS receiving unit to receive a GPS signal. The control unit includes a correction unit to correct the route to the optimal solution using the weather data acquisition unit, the number-of-strokes registration unit, and the GPS receiving unit. It is preferable that the correction unit redetermines an optimal solution for the rest of a corresponding one of the holes from a position at which a shot was made during play so that the target score is achieved.

The golf course data storage unit stores data of a plurality of the golf courses. It is preferable that the control unit is configured or programmed to allow selection of a golf course in which the target score is achievable from the plurality of golf courses.

A golf analysis assistance method according to the present invention is performed by the control unit of the golf analysis assistance apparatus, the method includes acquiring a target score on an entire golf course, the target score being set by a player, acquiring an attribute of the player, acquiring weather data, acquiring an attribute of the golf course, determining a route to an optimal solution from a tee shot to a final putt on each of holes of the golf course from the attribute of the player, the attribute of the golf course, and the weather data so that the target score is achieved, and displaying the route to the optimal solution.

A non-volatile computer-readable storage medium according to the present invention stores a golf analysis assistance program causing a computer to function as the golf analysis assistance apparatus, or to perform the method described above.

Advantageous Effects of Invention

According to the present invention, the target score acquisition unit that acquires the target score throughout the course is arranged, and the optimal solution and the optimal solution route at each hole enabling achievement of the target score are presented. This enables image training for conquering a course as a simulation before play. Additionally, during the play, correcting the optimal solution or the optimal solution route makes it easier for the player to achieve the target score throughout the course set by the player himself/herself.

BRIEF DESCRIPTION OF THE DRAWINGS

FIG. 3 is a diagram illustrating an example of a score card on which an optimal solution (personal-PAR), which is obtained by the golf analysis assistance apparatus according to the embodiment of the present invention, is printed.

FIG. 6 illustrates an example of a display screen that displays an optimal solution route.

FIG. 8 illustrates an example of player data regarding a club and a carry.

FIG. 9 illustrates an example of player data regarding a score and a degree of difficulty.

FIG. 10 illustrates an example of a display screen that displays a corrected optimal solution route.

FIG. 12 illustrates an example of display of an optimal solution and a player's score in a match play system.

FIG. 14 illustrates an example of display of a derivation process in the flowchart in FIG. 13.

DESCRIPTION OF EMBODIMENTS

Embodiments of the present invention will be described below with reference to the drawings.

Figure 1:
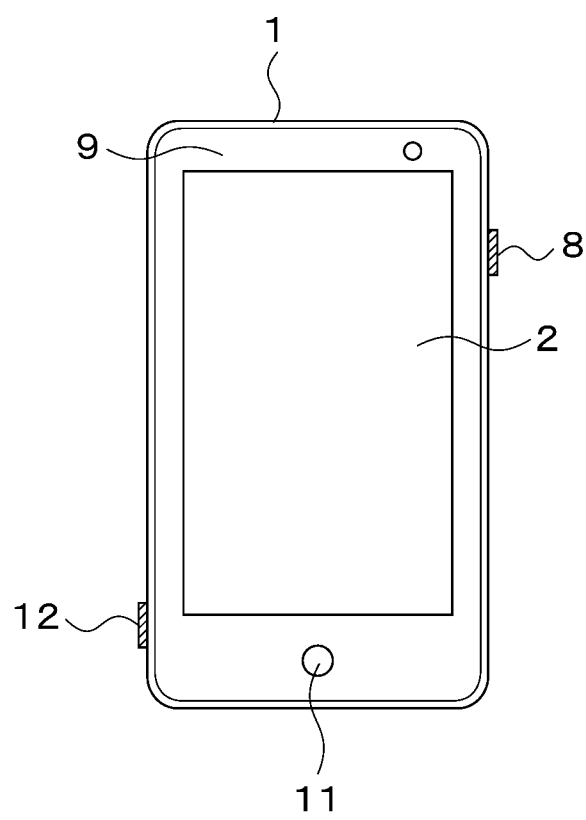
FIG. 1 is a schematic plan view of a golf analysis assistance apparatus according to an embodiment of the present invention.
Figure 2:
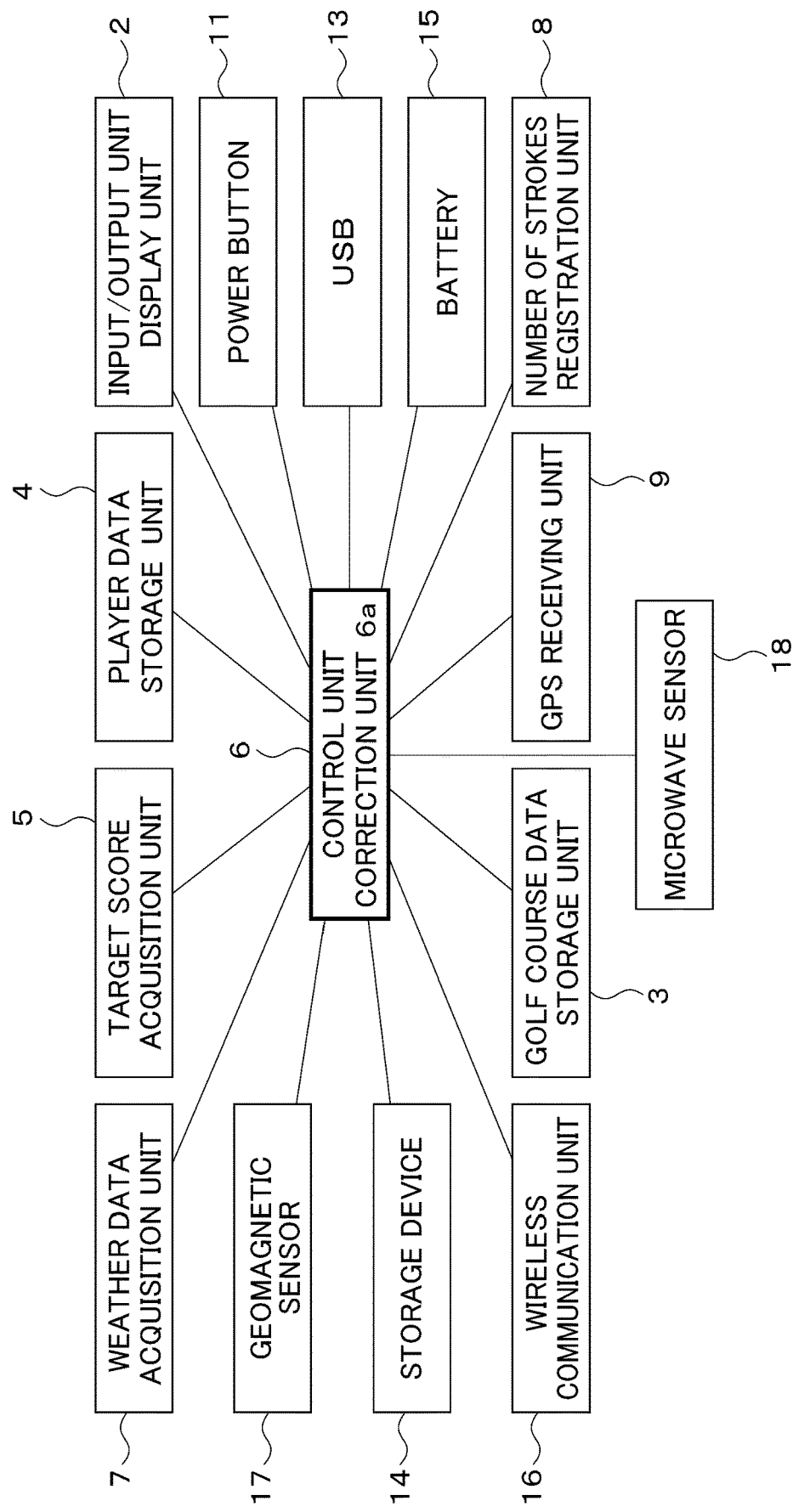
FIG. 2 is a block diagram of members of the apparatus illustrated in FIG. 1.

FIG. 1 is a configuration diagram illustrating a golf analysis assistance apparatus, and FIG. 2 is a block diagram illustrating the golf analysis assistance apparatus. The apparatus is composed of hardware and software.

As illustrated in FIG. 1, the golf analysis assistance apparatus includes a main body 1. The main body 1 is provided with a display unit 2. The main body 1 includes, as illustrated in FIG. 2, a golf course data storage unit 3, a player data storage unit 4, a target score acquisition unit 5, and a control unit 6. The golf course data storage unit 3 stores an attribute of a golf course. The player data storage unit 4 stores an attribute of a player. The target score acquisition unit 5 acquires a target score set by a player in a golf course.

The control unit 6 computes and obtains an optimal solution at each hole for a player from making of a tee shot to dropping in the cup so that the player can achieve a target score based on attribute data in the golf course data storage unit 3 and attribute data in the player data storage unit 4, and also computes and obtains an optimal solution route. The control unit 6 is configured to display the obtained optimal solution and the optimal solution route on the display unit 2.

The golf course data storage unit 3 stores, as data regarding the attribute of the golf course, positional information such as a name and a location, a distance of the golf course, two-dimensional and three-dimensional layout information, and positional information of an object on a green or a hazard (an obstacle area within the course such as a bunker, a pond, a small stream, and a valley) in the course.

The player data storage unit 4 stores, as information regarding the attribute of the player, a carry with each golf club (hereinafter referred to as a club) used by the player, head speed indicating ability of the player, and data regarding contents of play such as scores, the number of shots, and the number of putts in a golf course played by the player in the past.

The main body 1 includes a weather data acquisition unit 7 that acquires weather data of a temperature, a wind direction, a wind velocity, and a humidity in a golf course on a timely basis. The control unit 6 is configured to use the weather data acquired by the weather data acquisition unit 7 to obtain the optimal solution route.

The optimal solution route is set by obtaining of, at each hole, the number of strokes including the number of shots until the ball is put on the green and the number of putts, which should be aimed at by the player to achieve the target score, that is, the optimal solution. The number of strokes is a limit number of strokes that may be made to achieve the target score in a hole (hereinafter referred to as the "optimal solution" (personal-PAR)).

In other words, the "optimal solution" is obtained based on each of the attribute data described above so that an "aggregate total" for all holes totaling "subtotals" of the number of shots until the ball is put on the green and the number of putts on the green at respective holes is matched with the "target score" described above. That is, the "personal-PAR" is not a reference number of strokes (official- PAR) set by the golf course, but is the "optimal solution" at each hole so that the target score throughout the course set by the player can be achieved. The "optimal solution route" is composed of a route including presentation of a type of a recommended golf club for achieving the number of shots described above and presentation of a carry with the golf club.

Note that how to obtain the "optimal solution" and the "optimal solution route" will be described later.

Additionally, the control unit 6 includes a correction unit 6a that corrects the optimal solution route. After the start of the play, when the player plays from a location that is different from a location on the optimal solution route initially indicated by the apparatus (main body 1), the correction unit 6a re-derives an optimal solution route for achieving the target score from this location.

The main body 1 includes a number of strokes registration unit 8 and a global positioning system (GPS) receiving unit 9. The control unit 6 acquires the present position from the GPS receiving unit 9 through an operation of the number of strokes registration unit 8. The control unit 6 uses the correction unit 6a to correct the optimal solution route for achieving the target score. The control unit 6 is configured to perform updating to a corrected optimal solution route subjected to the correction from the present position, and display the corrected optimal solution route on the display unit 2.

The golf course data storage unit 3 stores data of a plurality of golf courses. The control unit 6 is configured to be able to select a golf course in which the target score is easily achieved from the plurality of golf courses.

The control unit 6 is configured to be able to provide technical information for each course when the golf course is selected.

More details will be described below.

In FIG. 1, the main body 1 is formed of a flat, substantially rectangular case. The "main body 1" is hereinafter also referred to as a "case 1".

The display unit 2 is arranged on an upper surface of the case 1. The display unit 2 is composed of a semi-transmissive liquid crystal touch panel. The display unit 2 composed of the touch panel also functions as an input/output unit 2 for various kinds of data. That is, in the present embodiment, the display unit 2 serves both as an input unit and an output unit. However, the input/output unit 2 may be composed of different members for the input unit and the output unit.

Members illustrated in FIG. 2 are composed of electronic devices such as microprocessors.

The target score acquisition unit 5 acquires or stores the target score throughout the course set by the player in the golf course.

The "target score" is the number of strokes in a round (typically, 18 holes are played), which is set by the player at the start of golf play. For example, when the player wants to round a course of a "par 72" with a "par 99", "99" is the "target score".

The "par 72" described above is the "official-PAR" set by the golf course, and the "par 99" corresponding to the target score set by the player is the "personal-PAR".

The "target score" is input by the player touching a target score input icon displayed on the display unit 2. The input target score is stored in the target score acquisition unit 5, and recognized by the control unit 6 as a parameter for deriving the optimal solution and the optimal solution route for achieving the target score.

The control unit 6 obtains the optimal solution route from making of a tee shot to dropping in the cup based on data in the golf course data storage unit 3 and the player data storage unit 4 and displays the optimal solution route on the display unit 2 so that the target score can be achieved.

The control unit 6 includes a microprocessor that includes a central processing unit (CPU), a read-only memory (ROM), a random-access memory (RAM), a flash memory, various kinds of peripheral circuits, an interface, and the like. The control unit 6 is supplied with power by power-ON, and starts an operation. The control unit 6 loads an operating system (OS) and an application program, which are recorded in a flash memory, onto the RAM with a boot loader recorded in the ROM, executes the OS and the application program on the RAM, and thereby executes various kinds of processing described later to implement various kinds of functions.

The golf course data storage unit 3 stores positional information such as a name and a location, two-dimensional and three-dimensional layout information of each hole in a golf course, positional information of an object on a green or a hazard (an obstacle area within a course such as a bunker, a pond, a small stream, and a valley) in the course, and standard-PAR (official-PAR) information set by the golf course.

The golf course data storage unit 3 is composed of an internal memory and a recording medium such as a detachable external recording medium (micro secure digital (SD) memory card or the like).

Data such as a course layout is preliminarily stored in the golf course data storage unit 3, but can be updated by communication.

The player data storage unit 4 stores a carry corresponding to a type of each golf club used by the player (a club number of a driver, a utility club, an iron, or the like) used by the player, individual head speed (swing speed) of the player, data regarding contents of play in a golf course that has been played by the player in the past, and other data.

In a case of the play for the first time, the player data storage unit 4 is only required to store information regarding a maximum carry or head speed (swing speed) of the player. These pieces of data may be input by the player himself/herself, or may be measured by a microwave sensor 18 and stored in the player data storage unit 4.

The more data regarding contents of play is accumulated in the player data storage unit 4, the more accurate optimal solution route that is reflective of a play tendency of the player can be derived. Note that the player may be able to input information regarding play such as a carry with each club, a directional property of a shot ball, and likes and dislikes of clubs before play. This input information is stored in the player data storage unit 4, and the control unit 6 can perform calculation based on these pieces of information to derive the optimal solution route.

With respect to the data regarding the contents of play, the control unit 6, for example, when acquiring the present position from the GPS receiving unit 9 through an operation of a number of strokes registration button 8, calculates a carry of a shot ball immediately before from the present position and a teeing area or from a position where the correction is made, and can thereby store the carry in the player data storage unit 4. In addition, the control unit 6 preferably stores, during the play or after the play, a total score and information regarding the number of strokes for each of shots and putts at each hole in the player data storage unit 4. A technique that is commercialized utilizing Radio-Frequency Identification (RFID) or a gyro system may be used to acquire information of a club in use. In a case of utilizing this technique, the control unit 6 can automatically register the number of strokes in the number of strokes registration unit 8 not by means of an operation of the number of strokes registration button 8.

Furthermore, the control unit 6 calculates a directional property of a shot ball, variations in carry for each club, and the like from the acquired contents of the play, and can thereby store a result of the calculation together with conditions such as weather information acquired during the play in the player data storage unit 4.

The weather data acquisition unit 7 acquires weather data announced by a meteorological agency or the like on a timely basis. When deriving the optimal solution route, the control unit 6 can derive a more appropriate optimal solution route if utilizing the weather data acquired by the weather data acquisition unit 7. For example, in a case where wind at 1 meter per second blows in a direction identical to a shot direction at a hole (called as follow wind in Japan), the control unit 6 multiplies the player's carry stored in the player data storage unit 4 with a coefficient, for example, 1.01, in accordance with a wind velocity, and can thereby correct carry information.

The weather data may be manually input by the player. This allows the player to adapt to, for example, a situation where a wind direction or the like changes every second depending on the shape of a hole.

The number of strokes registration unit 8 is arranged on a side surface of the case 1. The number of strokes registration unit 8 is configured as the number of strokes registration button 8 having a number of strokes registration function. A power button 11 is disposed on the upper surface of the case 1. The power button 11 is utilized as a button for switching not only between ON and OFF of power but also between locking and unlocking of a touch panel operation, and also as a button for returning from a screen displayed during the play to a menu screen.

Specifically, power is ON when the control unit 6 recognizes that the power button 11 has been held down (for example, 2 seconds or longer) in a power-OFF state, and the control unit 6 displays a predetermined main menu screen (refer to FIG. 4) on the display unit 2.

In addition, when recognizing that the power button 11 has been held down in a power-ON state, the control unit 6 draws a predetermined end screen on the display unit 2 and thereafter turns the power OFF.

The number of strokes registration button 8 is a button used for registering the number of strokes, and specific processing functions of the control unit 6 associated with operations of this button 8 will be described later.

In substitution for the number of strokes registration button 8, a number of strokes registration icon may be displayed on the display unit 2. The number of strokes registration icon may be drawn on a course layout side displayed during the play (the "number of strokes registration icon" is displayed, for example, on a lower right portion of FIG. 10) so that the number of strokes can be registered by the user touching the number of strokes registration icon. Alternatively, even if the apparatus does not include the number of strokes registration button 8 like the apparatus illustrated in FIG. 1, the number of strokes may be able to be registered through an operation of a touch panel on the display unit 2.

The number of strokes registration button 8 or the number of strokes registration icon constitutes the "number of strokes registration unit 8" according to the present invention.

The GPS receiving unit 9 that receives electric waves from a GPS satellite is implemented inside the case 1 on the front side. The GPS receiving unit 9 receives GPS signals and obtains the present position (longitude and latitude).

An openable terminal cover 12 is mounted on the side surface of the case 1. When the terminal cover 12 is opened, a universal serial bus (USB) type-C terminal 13 is exposed. Power can be charged by an alternating current (AC) adapter being connected to the USB type-C terminal 13, and data can be transmitted/received by the USB type-C terminal 13 being connected to a USB cable and thereby being connected to a personal computer. The terminal may conform to another standard.

As illustrated in FIG. 2, a storage device 14 arranged inside the case 1 records a computed result, and may be a non-detachable internal storage device or a slot unit (including a reading and writing function) for mounting a detachable recording medium such as an SD memory card. A recording medium and a device constituting this storage device 14 may be shared by the golf course data storage unit 3 and the player data storage unit 4 in an actual apparatus.

A battery 15 is a secondary battery that can be charged like a rechargeable battery, and can be charged from the USB type-C terminal 13. The control unit 6 obtains an azimuth direction or angle of the apparatus based on output from a geomagnetic sensor 17.

Besides the above, the main body 1 includes a wireless communication unit 16, a microwave sensor 18, and the like.

The control unit 6 accesses the golf course data storage unit 3 based on information of the present position from the GPS receiving unit 9, acquires information regarding the golf course, and performs control to output the information to an output device. The display unit 2 constitutes the output device. The storage device 14 stores an execution result and the like of the control unit 6.

A printing unit that prints contents and the like to be displayed on the display unit 2 can be arranged as the output device.

That is, the display unit 2 constitutes the input/output unit 2 according to the present invention, and can include the printing unit as an output unit 2 of the input/output unit 2.

FIG. 3 illustrates a score card on which printing is performed by the printing unit or an external printing device.

A table on the left side in FIG. 3 is a score table of an out course from the first to nineth holes, and a table on the right side is a score table of an in course from the tenth to eighteenth holes. "PAR" in a field on the right side of each table indicates a reference number of strokes (official-PAR) set by the golf course. Typically, the "official-PAR" at each hole is "5" at a long hole, "4" at a middle hole", and "3" at a short hole. The official-PAR throughout the course is "72".

"P.PAR" for each of "SHOT" and "PUTT" is the "personal-PAR". The "personal-PAR" is the "optimal solution" at each hole so that the target score throughout the course set by the player can be achieved.

FIG. 3 illustrates the "optimal solution" at each hole in a case where the target score throughout the course is set to "99". For example, while the reference number of strokes (official-PAR) set by the golf course is "4" at the first hole in the out course, inputting "the target score of 99" allows the assistance system according to the present embodiment to obtain the personal-PAR (optimal solution) for the first hole as "5" shots and "2" putts, a subtotal of "7".

A function of the control unit 6 for obtaining the optimal solution at each hole from making of a tee shot to dropping in the cup based on the attribute data in the golf course data storage unit 3 and the player data storage unit 4 so that the target score throughout the course can be achieved will be detailed later.

Figure 4:
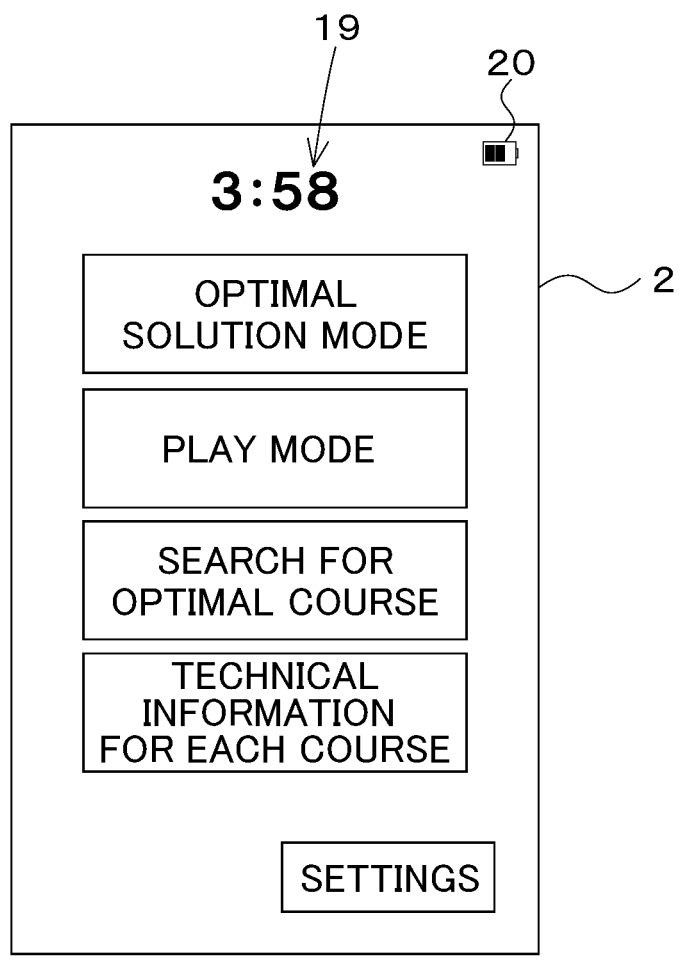
FIG. 4 illustrates an example of a main menu screen displayed on a display unit of the apparatus illustrated in FIG. 1.

FIG. 4 illustrates a display example of a main menu screen of the apparatus.

A time 19 is displayed on an upper portion of the screen and a remaining battery level 20 is displayed on an upper right side.

Icons drawn on the display unit 2 as the main menu are "OPTIMAL SOLUTION MODE", "PLAY MODE", "SEARCH FOR OPTIMAL COURSE", "TECHNICAL INFORMATION FOR EACH COURSE", and "SETTINGS".

The "OPTIMAL SOLUTION MODE" is an icon for causing the apparatus to derive the optimal solution route in the golf course from the user's target score.

The "PLAY MODE" is an icon for causing the apparatus to correct the optimal solution route every time the player plays with reference to the optimal solution route to achieve the target score, and present the optimal solution route in accordance with a play situation.

The "SEARCH FOR OPTIMAL COURSE" is an icon for causing the apparatus to present golf course information that facilitates achievement of the target score.

The "TECHNICAL INFORMATION FOR EACH COURSE" is an icon for causing the apparatus to present technical information that is necessary in the golf course selected by the user to achieve the target score.

The "SETTINGS" is an icon for making various kinds of settings to the apparatus.

Functions of the control unit 6 corresponding to the respective icons will be described later.

The functions of the control unit 6 will be described below based on a specific display screen.

Figure 5:
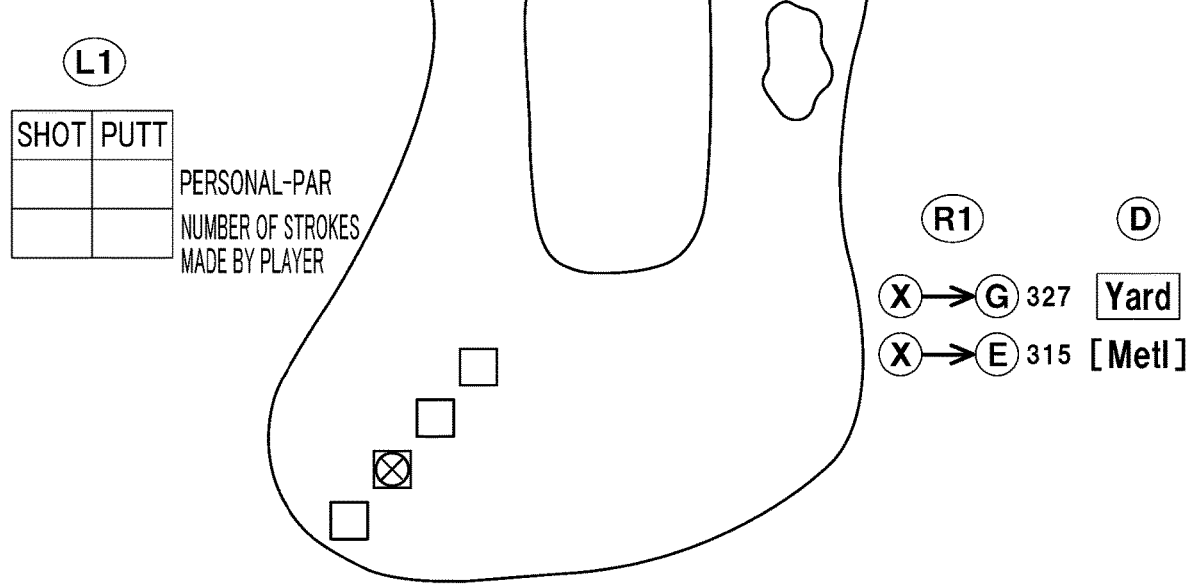
FIG. 5 illustrates an example of a display screen that displays data stored in a golf course data storage unit.

FIG. 5 illustrates an example of a display screen that visualizes data stored in the golf course data storage unit 3 and that is displayed on the display unit 2.

Attribute data such as the two-dimensional and three-dimensional layout information of the golf course is provided by the golf course or the like, and is stored as an "initial value" in the golf course data storage unit 3.

Data regarding a position of a green and a position of a pin on the play day is input from the input unit 2 on the play day, and is stored as a "today's value" in the golf course data storage unit 3. The input on the day is automatically performed by wireless communication, or manually performed by the player from the input/output unit 2.

The control unit 6 performs drawing on the display unit 2 using the "initial value" on the previous day of the play day, and performs drawing on the display unit 2 using the "today's value" on the play day.

FIG. 5 illustrates a layout of the sixth hole. The control unit 6 accesses the golf course data storage unit 3, reads out information of the sixth hole, and performs drawing on the display unit 2. Examples of the display screen on the display unit 2 include a plan view and a height difference view (sectional view), which are respectively illustrated in the middle of and on the lower side of FIG. 5 or the like. As illustrated, the control unit 6 draws a layout of a hole being played on the whole of the display screen so that the green is positioned on the upper side. The height difference view is drawn to illustrate from the teeing area (X mark) to the green by disposing a hole layout in a horizontal direction and the green on the right side.

A remaining distance display area R1 is set on the right lower side of the screen. That is, a position of an edge of the green and a position of a middle of the green are registered as information of the green in the golf course data storage unit 3. The control unit 6 performs drawing by superimposing an icon G on the middle of the green, obtains a distance from the teeing area and the middle of the green (in a case where there is a fairway, a distance passing through the center of the fairway), and displays the distance (X to G: "327" in FIG. 5). X represents a position of the teeing area, G represents a position of the middle of the green, and E represents a position of the edge of the green. The distance to the middle of the green serves as a reference when the optimal solution is obtained. A setting of changing the reference to, for example, the position of the edge of the green or other settings can be made by the player.

Additionally, an icon B representing a remaining battery level and an icon N representing a hole number are displayed on an upper area of the display screen of the display unit 2. An icon D (yd (yards)/m (meters)) representing a unit of distance display is displayed in the R1 area on the right lower side. A setting of changing display is made by the user. Furthermore, a time is displayed on the upper middle of the information area. An elapsed time from the start of the play may be displayed in this middle area. Play fast is an important element in golf play, and the elapse of time serves as a rough indication for the play fast.

A display area L1, in which a personal-PAR (optimal solution) for each of shots and putts at each hole and the number of strokes made by the player are input, is set on the lower left of the screen.

On the previous day of the play day, the control unit 6 obtains the optimal solution route for achieving the target score using the "initial value" in the golf course data storage unit 3 and the data in the player data storage unit 4. Note that the control unit 6 may use the data acquired by the weather data acquisition unit 7, such as weekly weather forecast, to derive the optimal solution route before the play.

On the play day, the control unit 6 obtains the optimal solution route for achieving the target score using the "today's value" in the golf course data storage unit 3, the data in the player data storage unit 4, and the data in the weather data acquisition unit 7.

FIG. 6 illustrates an example of a display screen of the optimal solution route.

The control unit 6 draws the optimal solution route for achieving the player's target score on the drawn hole layout using the data in the golf course data storage unit 3, the data in the player data storage unit 4, the data in the weather data acquisition unit 7, and the data in the target score acquisition unit 5.

A corresponding distance may be displayed alongside a trajectory of the displayed optimal solution route, and furthermore, a club appropriate for a distance displayed based on recorded player data may be displayed together. These settings are made by the player.

Functions of the control unit 6 for obtaining the optimal solution and the optimal solution route will be described in detail below.

The "OPTIMAL SOLUTION MODE" on the menu screen in FIG. 4 is selected. Selecting this mode displays an input screen on the display unit 2. An operation is performed in accordance with an instruction on the screen thereafter.

Figure 7:
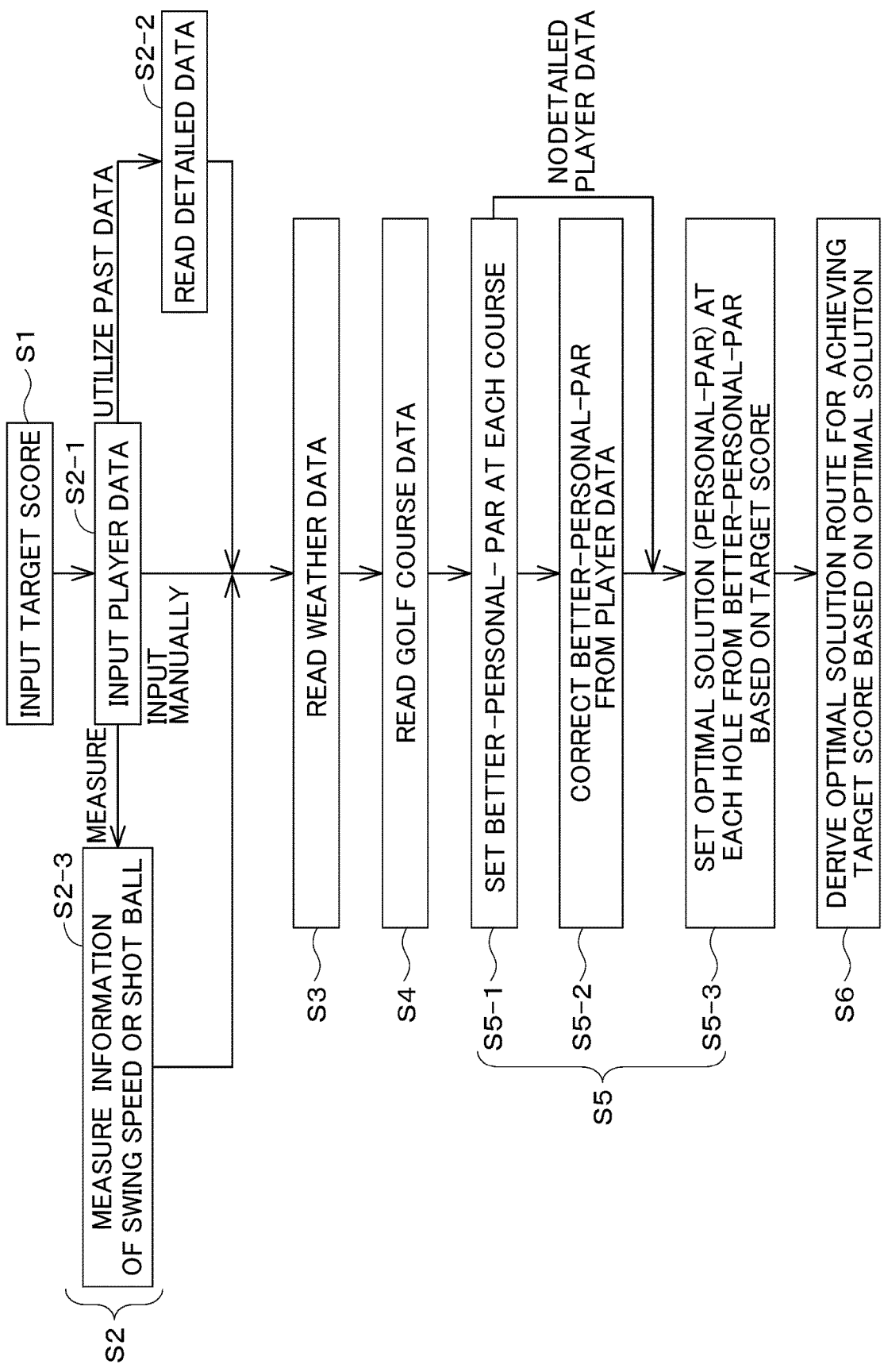
FIG. 7 is a flowchart for deriving the optimal solution route.

FIG. 7 indicates operation procedures and functions of the control unit 6.

A target score is input from the input/output unit (S1). In the present embodiment, the player hopes to break the score of "100", and thus inputs "99" as the target score. The control unit 6 stores input data in the target score acquisition unit 5.

Player data is input (S2). Examples of the player's attribute data are illustrated in FIGS. 8 and 9. These pieces of data are manually or automatically input. The control unit 6 stores input data in the player data storage unit 4.

The player data storage unit 4 stores a carry corresponding to a type of each golf club used by the player, individual head speed (swing speed) of the player, data regarding contents of play in a golf course that has been played by the player in the past, and other data.

In a case of the play for the first time, the player data storage unit 4 stores information regarding a maximum carry or head speed (swing speed) of the player. These pieces of data are input by the player himself/herself, or measured by the microwave sensor 18 and stored in the player data storage unit 4.

The more data regarding contents of play is accumulated in the player data storage unit 4, the more accurate optimal solution route that is reflective of a play tendency of the player can be derived. Note that the player can input information regarding play, such as a carry with each club, a directional property of a shot ball, and likes and dislikes of clubs before the play. The input information is stored in the player data storage unit 4, and the control unit 6 can perform calculation based on these pieces of information to derive the optimal solution route.

With respect to the data regarding the contents of the play, the control unit 6, for example, when acquiring the present position from the GPS receiving unit 9 through an operation of the number of strokes registration button 8, calculates a carry of a shot ball immediately before from the present position and the teeing area or from the position where the correction is made, and thereby stores the carry in the player data storage unit 4. In addition, the control unit 6 stores, during the play or after the play, a total score and information regarding the number of strokes for each of shots and putts at each hole in the player data storage unit 4. The technique that utilizes a RFID or a gyro system is used to acquire information of a club in use. In a case of utilizing this technique, the control unit 6 can automatically register the number of strokes in the number of strokes registration unit 8 not by means of an operation of the number of strokes registration button 8.

Furthermore, the control unit 6 calculates a directional property of a shot ball, variations in carry for each club, and the like from the acquired contents of the play in the past, and stores them together with conditions such as weather information acquired during the play in the player data storage unit 4.

The weather data is read (S3). The control unit 6 stores the read weather data in the weather data acquisition unit 7.

Weather data announced by the meteorological agency or the like is acquired as the weather data on a timely basis. Forecast data is used on the previous day of the play day, or the like. For example, a situation in which a wind direction or the like changes every second depending on the shape of a hole is input during the play. The input can be performed manually or automatically through wireless communication.

Data of a golf course is read (S4). The control unit 6 stores the read data of the golf course in the golf course data storage unit 3. Attribute data such as two-dimensional and three-dimensional layout information of each hole of the golf course is provided by the golf course or the like, and is stored as an "initial value" in the golf course data storage unit 3.

Data regarding a position of a green and a position of a pin on the play day is stored as a "today's value" in the golf course data storage unit 3 on the play day. The input of the today's value is automatically performed by wireless communication, or manually performed by the player.

The control unit 6 obtains an optimal solution based on various kinds of data described above (S5).

The control unit 6 derives an optimal solution route for achieving the target score based on the optimal solution (S6).

Derivation of the optimal solution and the optimal solution route will be described in detail below.

The optimal solution is a result of derivation of the number of strokes (the number of shots and the number of putts) that should be aimed at by the user to achieve the target score at each hole of the golf course being played, in accordance with the user's target score and other conditions (an attribute of the golf course, an attribute of the player, a weather condition, and the like). The optimal solution route is a route from the teeing area to the hole on the green (a cup and a pin), which is derived in accordance with the number of strokes that should be aimed at. The optimal solution route to be drawn may be a route regarding only shots, or may include a route regarding putts.

A detailed description will be given of a function of the control unit 6 for obtaining the optimal solution (personal-PAR) at each hole to achieve the target score throughout the course with reference to FIG. 6.

A hole of 327 yards illustrated in FIG. 6 is usually a middle hole, and the reference number of strokes (official-PAR) set by the golf course is generally "4 ("two shots"+ "two putts")".

On the other hand, in FIG. 6, "the optimal solution (personal-PAR) is "three shots" and "two putts", and a subtotal of the personal-PAR is "5" (refer to sixth hole in FIG. 6).

The control unit 6 sets a difference between the player's target score and a minimum number of strokes that can be physically achieved by the player as a redundancy in the number of strokes and allocates the redundancy in the number of strokes to respective holes to derive the personal-PAR. The minimum number of strokes that can be physically achieved is calculated using any of data regarding a carry, such as the player's theoretical carry, which will be described later, a carry input by the player himself/herself, and a maximum carry in play data in the past, and is not necessarily limited to an actual carry.

For example, as will be described later in detail, the player whose carry with a driver is 200 yards and whose maximum carry in a case of not teeing the ball up is 150 yards can play a hole of 350 yards from the teeing area to the middle of the green (a hole at which the reference number of strokes (official-PAR) set by the golf course is 4) with "two shots"+ "two putts". In a case where this is a hole of 351 yards, the player can play the hole with "three shots"+"two putts".

In consideration of characteristics of golf, however, even if the minimum number of strokes can be achieved theoretically with the player's carry, there occurs an unnecessary risk due to an error in selecting a club, psychological pressure, or the like, and as a result, it is highly likely that the target score fails to be achieved. For example, many players experience a phenomenon such as a sudden blow up, after completion of play with remaining three holes left behind, regardless of the play at a pace at which the target score can be sufficiently achieved. For this reason, presenting the target score (optimal solution) with a sufficient margin at each hole based on the score that the player wants to achieve can increase an overall achievement rate of the target score.

That is, for the player with a carry that enables play with the reference number of strokes (official-PAR) set by the golf course at all holes, an aggregate total of official-PARs (72 in many cases) is an achievable minimum number of strokes (a case where the number of putts is "2" at all holes). However, in a case where the player cannot always break the score of 100, the target score is set to 99 or the like. If the target score is 99, a redundancy between the target score and the achievable minimum number of strokes is "99−72=27". The personal-PAR at each hole is derived by allocating this redundancy in the number of strokes of 27 based on the layout of the golf course, the contents of past play of the player, or the like. At this time, the redundancy is allocated so that an aggregate total of personal-PARs at the respective holes becomes the target score further using statistical elements or psychological elements regarding the player if necessary.

Note that in a case where the input target score cannot be achieved with the player's carry, the control unit 6 preferably calculates a minimum value of the target score that can be achieved in accordance with the player's carry so that the player can re-input the target score of this value or greater.

The following description will be given of how to obtain a "personal-PAR of (3+2=5)" at this hole in accordance with a flowchart illustrated in FIG. 7.

In a case where the player inputs 99 as the target score, the control unit 6 acquires, for example, the following data. The control unit 6 first acquires data regarding a distance of 327 yards from the teeing area to the middle of the green (X to G) at the sixth hole in the golf course that is selected by the player and that is illustrated in FIG. 6, from the golf course data storage unit 3. The control unit 6 acquires data regarding the player's carry such as the player's maximum carry of 178 yards and a maximum carry of 163 yards in a case of hitting the ball from a ground surface (not teeing the ball up), from the player data storage unit 4. The control unit 6 acquires data regarding weather, such as a wind direction around the golf course being the east, a wind velocity of 1 m, and a temperature of 25° C., from the weather data acquisition unit 7, and other data.

In this case, at the sixth hole illustrated in FIG. 6, a physically possible minimum number of strokes until the ball is put on the green with the player's carry (178+163=341 yards>327 yards) is "2". A subtotal of "4" obtained by adding the minimum number of putts of "2" to this physically possible minimum number of strokes until the ball is put on the green of "2" is the player's minimum number of strokes (better-personal-PAR) until holing out. That is, this corresponds to step "S5-1" indicated in FIG. 7. In the present example, the data regarding the theoretical carry illustrated in FIG. 8 is used in step S5-1. The theoretical carry may be automatically calculated by a coefficient (head speed m/s×5.5) generally used when a carry is obtained from head speed recorded in the player data storage unit 4, or may be input by the player as a maximum carry with each club. Although not illustrated in FIG. 8, data regarding a maximum carry input by the player, data regarding a maximum carry in play data in the past, or the like may be used for calculation, in substitution for the theoretical carry. This setting can be changed by the player.

Note that the number of "putts" is always fixed to "2" as a default setting. This is because a putt operation to roll the ball and put the ball into the cup on the green is composed of elements of two strokes, an operation of approaching the ball to the cup (approach) and an operation of putting the ball into the cup (drop in the cup). As a matter of course, for a player who is good at putting or poor at putting, the calculation can be performed in consideration of information of putting as an attribute of the player, if recorded, as described later (a fourth example). However, the description herein is given assuming "the number of putts being 2" as the fixed number for simplifying the description.

The control unit 6 performs such calculation of a subtotal at each hole, and obtains an aggregate total of subtotals for all the holes. The control unit 6 obtains whether there is a difference between the aggregate total and the target score of 99, that is, whether there is a redundancy in the number of strokes.

In a case where there is no redundancy in the number of strokes, the control unit 6 performs step "S5-3" without performing step "S5-2". That is, a subtotal of the minimum number of strokes until the ball is put on the green and the number of putts is the personal-PAR at each hole. This personal-PAR is the "optimal solution" (step "S5-3").

In a case where there is the redundancy in the number of strokes, the control unit 6 corrects the better-personal-PAR (S5-2).

FIG. 6 illustrates a result in a case where the control unit 6 determines that there is the redundancy in the number of strokes. That is, this is a case where the better-personal-PAR (subtotal) at the sixth hole is "4", and an aggregate total of subtotals at all the holes is, for example, 74.

Since the target score is 99, the redundancy in the number of strokes is "99−74=25", and this redundancy in the number of strokes is allocated to the respective holes.

Subsequently, in a case where play data in the past, such as a carry with each club and scores, is accumulated in the player data storage unit 4, the control unit 6 corrects the better-personal-PAR at a hole based on this information and resets the redundancy in the number of strokes. If there is no difference between the reset better-personal-PAR and the target score (no redundancy in the number of strokes), this better-personal-PAR is the optimal solution.

In a case where there is a further redundancy in the number of strokes, the redundancy in the number of strokes is allocated to the respective holes in accordance with a statistical element, a psychological element, a degree of difficulty of each hole, or the like so that the better-personal-PAR is matched with the target score.

For example, assume that the player data storage unit 4 includes information illustrated in FIG. 8. While a theoretical carry of the player with a driver (1-wood) is 178 yards, a success rate is 10% and a frequency of use is 2%. While a theoretical carry with a spoon (3-wood) is 163 yards, a success rate is 58%, and a frequency of use is 18%. When determining that the player is good at a tee shot with the spoon based on these pieces of data, the control unit 6 resets the theoretical carry of 163 yards for a tee shot with the spoon as a maximum carry. Furthermore, while a maximum theoretical carry with an iron (a club mainly for hitting the ball from the ground surface) is 126 yards, the control unit 6, if determining that the player does not usually use the iron with a carry of 108 yards or greater, resets the maximum carry with the iron to be 108 yards. As a result, the control unit 6 resets the player's physically possible minimum number of strokes until the ball is put on the green to "3". The control unit 6 then resets the number of "5" obtained by adding the minimum number of putts of "2" to this physically possible minimum number of strokes until the ball is put on the green of "3" as the player's minimum number of strokes (better-personal-PAR) at this hole. At this time, the minimum number of strokes of "3" until the ball is put on the green is preferably derived so that a breakdown thereof is, for example, 160 yards with the spoon (3W) on the first stroke, 85 yards with an 8-iron (8I) on the second stroke, and 82 yards with a 9-iron (9I) on the third stroke, based on data such as an average carry and an alienation rate. Note that FIG. 8 illustrates an example of data recorded assuming that the alienation rate is a ratio between the theoretical carry with each club and the player's average carry, the success rate is a ratio of the number of shots with a carry that is 75% or greater than the theoretical carry and at an angle between a vector indicated in the optimal solution route and a vector of an actual shot being 9 degrees or smaller, and a frequency of use is a use ratio of each club with respect to all shots. However, FIGS. 8 and 9 illustrate examples of data recorded in the player data storage unit 4, and coefficients used for calculation and items to be recorded may be changed. In addition, in a case where there is a difference in height between two spots on the optimal solution route (for example, a tee shot position and a position on the second stroke), the control unit 6 may correct the player's carry information in the player data storage unit 4 using a coefficient generally calculated in accordance with an inclination between the two spots (for example, a carry x 1.05 in a case of 10 m downhill) and perform calculation. Furthermore, the control unit 6 may correct, based on weather data acquired from the weather data acquisition unit 7, the player's carry information in the player data storage unit 4 in accordance with a wind velocity as described above.

The control unit 6 performs these re-calculations with respect to each hole, and calculates a subtotal of minimum numbers of shots and putts at each hole. If an aggregate total of subtotals is matched with the target score of 99, the control unit 6 sets the minimum number of shots and putts at each hole as the "personal-PAR (optimal solution)" at each hole.

In a case where the aggregate total of subtotals is still not matched with the target score of 99, the control unit 6 allocates the redundancy in the number of strokes to the respective holes in consideration of a psychological element, a statistical element, a degree of difficulty of each hole, or the like, based on data in the player data storage unit 4 as illustrated in FIG. 9, matches the aggregate total of subtotals of minimum numbers of shots and putts with the target score of 99, and calculates the personal-PAR (optimal solution) at each hole ("S5-3" in FIG. 7). Note that FIG. 9 illustrates data recorded assuming that "ALIENATION FROM PAR" is an average value of difference between the official-PAR and the player's actual play performance (score) at each hole, "ALIENATION FROM PERSONAL-PAR FOR SHOTS" is an average value of difference between the optimal solution (personal-PAR) for shots and the player's actual play performance (the number of shots) at each hole, and "ORDER OF VARIANCE" is the order of a degree of achievement of actual play performance with reference to the official-PAR and the personal-PAR for shots. In the data example illustrated in FIG. 9, the second hole has an average value of alienation between the official-PAR and the player's score is 2.4, and has the largest alienation in a "+(positive number)" direction (exceeding the reference) among all the holes. The second hole has an average value of alienation between the personal-PAR regarding shots and the number of shots made by the player is 1.1, and has the second largest alienation in the "+(positive)" direction (exceeding the reference) among all the holes. If this is an average value of data in a plurality of courses, it can be assumed that the player's score tends to worsen at the second hole due to some kind of psychological factor. If this is data in a specific course, it can be assumed that the second hole is the most difficult hole for the player. The control unit 6 allocates the redundancy to the second hole on a priority basis based on these pieces of data. For example, the control unit 6 performs the above-mentioned calculation, allocates the redundancy to each hole, and matches the aggregate total of personal-PARs at the respective holes with the target score.

The "personal-PAR" obtained by the above-mentioned calculation is the "optimal solution" at each hole to achieve the target score, and a result of routing the optimal solution is the "optimal solution route" ("S6" in FIG. 7).

That is, the optimal solution route is composed of a route including presentation of a type of a recommended club for achieving the number of shots described above and presentation of a carry with the club. At the sixth hole illustrated in FIG. 6, the optimal solution route is obtained so that a breakdown of "3" shots is a carry of 160 yards on a tee shot with the spoon, a carry of 85 yards with the 8-iron, and a carry of 82 yards with the 9-iron.

The optimal solution route at the sixth hole obtained in this manner is as illustrated in FIG. 6.

This is the first example regarding how to obtain the optimal solution.

As a second example, for example, it is also possible to set the personal-PAR at each hole by adding the redundancy in the number of strokes between the official-PAR set by the golf course and the target score to official-PARs in descending order of distances of the respective holes and allocating the redundancy in the number of strokes to the respective holes to match a number obtained by adding the number of the redundancy in the number of strokes to the official-PARs with the target score.

As a third example, it is also possible to set the personal-PAR at each hole by obtaining the better-personal-PAR until step S5-1 as described in FIG. 7, allocating the obtained redundancy in the number of strokes to the respective holes in ascending order of degrees of difficulty set by the golf course for the respective holes to match a number obtained by adding the redundancy in the number of strokes to the better-personal-PARs with the target score.

As a fourth example, in a case where the target score is "99" and the redundancy in the number of strokes is "27" in a course with the official-PAR of "72", and the number of putters per hole exceeds, for example, "2" in contents of play in the past in the player data storage unit 4, it is also possible to set the personal-PAR at each hole by allocating a redundancy in the number of strokes of "1" to each of the whole of 18 holes, and then allocating the remaining redundancy in the number of strokes of "9" to the respective holes in descending order of sizes of greens.

Note that the optimal solution route derived before the play is drawn to take a route from the teeing area to the middle of the green and pass through the middle of the fairway as illustrated in FIG. 6. At a hole without a fairway, the optimal solution route is preferably drawn to take a route passing through the middle of the hole or a straight route to the middle of the green.

The player can also perform image training for the play by seeing the derived optimal solution route on the previous day of the play day or the like.

Before the start of the play, the control unit 6 performs drawing so as to superimpose a player icon X at a position corresponding to the teeing area. During the play, the control unit 6 draws the player icon X at a position where the player is.

In addition, the control unit 6 obtains a horizontal distance between the teeing area or the player icon X and the green from the course information registered in the golf course data storage unit 3, and also displays, on an illustrated horizontal view, a difference in height from the teeing area to the green, a difference in height from the present position to a spot serving as a point such as a bunker in the course, and a difference in height from the present position to the green. How to display the illustrated horizontal view and plan view can be changed in accordance with settings made by the player.

Additionally, the control unit 6 draws a flag icon P at a location corresponding to a pin position (cup position) on the green. At this time, the control unit 6 may obtain a distance between the teeing area or the player icon X and the spot serving as a point such as the cup position, the edge of the green, and the bunker, and display these distances on the course layout or together with the remaining distance display area R1 (in FIG. 6, X to P: 332, X to E: 315, and 177 at the spot serving as the point such as the bunker). Display of these can be changed in accordance with settings made by the user.

Note that, in substitution for these procedures, it is also possible to, for example, initially derive the personal-PARs at the respective holes to become the target score only from data set by the golf course, and distribute carries and select clubs as appropriate for the player from player data to achieve the personal-PAR. Alternatively, the control unit 6 may obtain the optimal solution by a multiple-stage calculation method of dividing phases into a phase in which calculation processing is completed like S5-1 to S5-3 and a phase in which the calculation processing is ended in accordance with the target score, or may obtain the optimal solution by a one-stage calculation method using all the data. The flow illustrated in FIG. 7 exemplifies derivation of the optimal solution and the optimal solution route.

In is also preferable to display the better-personal-PAR initially calculated in derivation of the personal-PAR as the player's achievable minimum number of strokes, together with the optimal solution route.

That is, in derivation of the optimal solution and the optimal solution route before the play, when the player inputs the target score and selects the golf course, the control unit 6 calculates the optimal solution (personal-PAR) at each hole from making of a tee shot to dropping in the cup so as to achieve the target score so that an aggregate total for all holes totaling subtotals of the number of shots until the ball is put on the green and the number of putts on the green at the respective holes is matched with the target score using two-dimensional and three-dimensional layout information of the golf course in the golf course data storage unit 3, positional information of an object on the green or the hazard in the course, a carry and head speed with/of each golf club used by the player in the player data storage unit 4, and data regarding contents of play in the past, obtains a type of a golf club appropriate for achieving the number of shots as the obtained optimal solution at each hole and a carry with the golf club, and draws the optimal solution route on the display unit 2.

At this time, in a case where there is weather information obtained by the weather data acquisition unit 7 such as a wind direction and a wind velocity, the control unit 6 can calculate the optimal solution and the optimal solution route also with this information.

According to the present embodiment, the player conquers the hole by seeing the screen, and can thereby achieve the target score.

However, it is difficult to play exactly as what the optimal solution route indicates. To address this, in the present invention, correcting the optimal solution route after each shot enables achievement of the target score.

To correct the optimal solution route, "PLAY MODE" on the menu screen illustrated in FIG. 4 is selected. With this selection, the screen on the display unit 2 becomes the one as illustrated in FIG. 10.

FIG. 10 illustrates a display screen of the corrected optimal solution route during the play.

In the present embodiment, the main body 1 includes the number of strokes registration button 8, serving as the number of strokes registration unit 8, and the GPS receiving unit 9. The control unit 6 that includes the correction unit 6*a*, when acquiring the present position from the GPS receiving unit 9 through an operation of the number of strokes registration button 8, starts to correct the optimal solution route to achieve the target score, and displays the corrected optimal solution route subjected to the correction from the present position X on the display unit 2.

In addition, the display unit 2 draws a two-dimensional layout of the course, a sectional layout, the optimal solution route, the remaining distance display area R1, the optimal solution display area L1, and a direction indicator line T from the present position X toward a next target.

That is, it is possible to register the number of strokes based on a switch operation or the like of the number of strokes registration unit 8, and also correct the optimal solution route at the spot of the hole.

Specifically, after the start of the play, for example, if the player presses the button of the number of strokes registration unit 8 when making the second shot from a location that is different from a location on the optimal solution route for achieving the target score of "99", which has been derived at a point of time of making a tee shot on the first hole, the control unit 6 that includes the correction unit 6*a* recognizes that the number of strokes registration button 8 is pressed for a short period of time (for example, one second). The control unit 6 acquires the present location X at this time from the GPS receiving unit 9. At the same time, the control unit 6 recognizes that this is the spot for the second stroke, and thus may display the number of strokes in a box for the player's number of strokes in the L1 area in FIG. 10. Furthermore, the control unit 6 that includes the correction unit 6*a* accesses the golf course data storage unit 3, the player data storage unit 4, the weather data acquisition unit 7, and the target score acquisition unit 5, re-derives the optimal solution route from the spot of X with the target score being "98", and draws the optimal solution route on the hole layout. That is, the control unit 6 derives the optimal solution route with a remainder of the target score being "98" strokes by subtracting the number of shots, that is, "1", from the target score of "99".

Note that a method of this re-derivation will be described later with reference to FIG. 11.

At this time, the control unit 6 deletes and overwrites the originally drawn optimal solution route, but may draw the originally drawn optimal solution route and a trajectory of the player in a translucent manner, by dotted lines, or the like.

Display of these can be changed in accordance with settings made by the user. In a case where the player has to play from a special teeing area, under a special situation, or the like, the control unit 6 that includes the correction unit 6*a*, when recognizing the number of times that the number of strokes registration button 8 has been pressed for a short period of time, overwrites the number of strokes, corrects the optimal solution route from a spot where the button 8 has been pressed, and draws the optimal solution route on the display unit 2. When the number of strokes registration button 8 is unintentionally pressed, for example, holding down the number of strokes registration button 8 (for example, three seconds) may allow the control unit 6 to perform processing of drawing a number of strokes correction icon on the display unit 2, correction processing, or deletion processing.

When recognizing the player's movement to the teeing area based on positional information acquired from the GPS receiving unit 9 before a shot is made from the teeing area at each hole for the first time, the control unit 6 preferably draws the optimal solution route at the next hole on the display unit 2.

The control unit 6 may display, based on the acquired weather data, a wind direction, a wind velocity, a temperature, and a humidity in a display area W1 on the upper right of the screen. This setting can be changed by the user.

When recognizing that the number of strokes registration button 8 is pressed for a short period of time and a spot at which the present position acquired from the GPS receiving unit 9 is on the green, the control unit 6 processes acquired information indicating that the number of strokes registration button 8 is pressed for a short period of time while the acquired present position is moved from the green to the next hole as the number of putts, and can perform display by adding the number of putts in a box for the number of putts in the player's number of strokes in the L1 area on the display unit 2. Input of the player's number of strokes in the L1 area on the display unit 2 can be made and corrected anytime in accordance with settings made by the user such as after holing out. In addition, the L1 area may be displayed in detail as illustrated in FIG. 6, or may be simply displayed as illustrated in FIG. 10.

The player's number of strokes input in the L1 area can be aggregated or displayed in comparison with the personal-PAR, the target score, or the like on the display unit 2 anytime, and may be, for example, drawn and displayed like a score card arranged in the golf course (FIG. 3). The personal-PAR displayed in the L1 area on the display unit 2 may be able to be corrected during the play or allocated between a personal-PAR for shots and a personal-PAR for putts in accordance with a setting made by the user.

Furthermore, the control unit 6 detects an orientation of the apparatus based on output from the geomagnetic sensor 17, and performs drawing by superimposing the orientation, as the direction indicator line T comprising an arrow, on the hole layout. A starting point of the direction indicator line T is the present position (player icon X).

When recognizing that the number of strokes registration button 8 is pressed for a short period of time, the control unit 6 records the present position acquired from the GPS receiving unit 9 in the storage device 14. This record can be overwritten or deleted in accordance with a setting made by the user, or transmission/reception of data can be performed by the USB type-C terminal 13 being connected to the USB cable and thereby being connected to the personal computer.

In addition, the control unit 6 can display a trajectory of the player's movement on the course layout. Alternatively, the control unit 6 that includes the correction unit 6a recognizes that the number of strokes registration button 8 is pressed for a short period of time, outputs a spot at which the originally drawn optimal solution route is corrected from the storage device 14, and can thereby also display a distance or a trajectory between the spot and the teeing area or a spot at which the number of strokes registration button 8 has been pressed for a short period of time previously at the hole.

The distance is preferably displayed, when the trajectory of the play is drawn in the course layout on the display unit 2, alongside the trajectory (171 in FIG. 10).

As described above, correcting the optimal solution route for every shot can facilitate achievement of the target score.

Note that other functions of the control unit 6 can be similar to those disclosed in, for example, "Japanese Unexamined Patent Application Publication No. 2018-11992".

Figure 11:
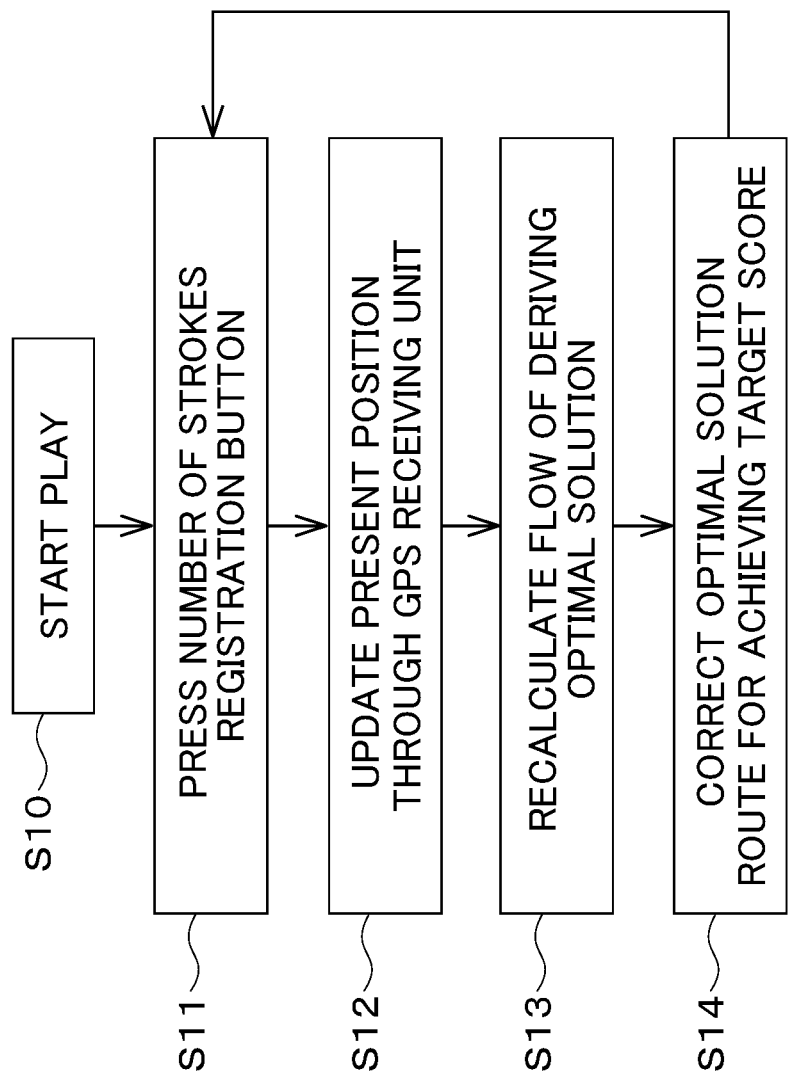
FIG. 11 is a flowchart for deriving the corrected optimal solution route.

FIG. 11 is a flowchart for the control unit 6 that includes the correction unit 6a to derive the corrected optimal solution route during the play.

The flow of correcting the optimal solution includes a step S10 of starting play, a step S11 of operating the number of strokes registration unit, a step S12 of updating the present position, a step S13 of recalculating the optimal solution, and a step S14 of correcting the optimal solution route.

In the step S10 of starting the play, when the user selects the PLAY MODE on the main menu screen drawn on the display unit 2, inputs a target score, and selects a golf course being played, or the control unit 6 identifies a golf course being played based on positional information acquired from the GPS receiving unit 9, the control unit 6 recognizes that the user will play, and starts the flow of correcting and presenting an optimal solution route in accordance with the user's play until the end of the play.

At this time, in a case where the OPTIMAL SOLUTION MODE is selected, the target score is input, and the control unit 6 determines that the input golf course is identical to a golf course where the user is via the GPS receiving unit 9, the control unit 6 may automatically switch to the PLAY MODE without the user's selection of the PLAY MODE.

In the step S11 of operating the number of strokes registration unit, the number of strokes registration button 8 is pressed for a short period of time during the play. As the step S12 of updating the present position, the control unit 6 that includes the correction unit 6a accesses the GPS receiving unit 9. As the step S13 of recalculating the optimal solution, the control unit 6 obtains the optimal solution for achieving the target score from this position. As the step S14 of correcting the optimal solution route, the control unit 6 derives a new optimal solution route from the position. The control unit 6 thereby displays the screen illustrated in FIG. 10 on the display unit 2.

Specifically, after the start of the play, for example, if the player presses the button of the number of strokes registration unit 8 when making the second shot from a location that is different from a location on the optimal solution route for achieving the target score of "99" that has been derived at a point of time of making the first tee shot, the control unit 6 that includes the correction unit 6a acquires a position of the second shot from the GPS receiving unit 9, and re-derives the optimal solution route as the target score of "98" by subtracting the number of stroke of the tee shot "1" from the spot. The control unit 6 similarly performs correction of the optimal solution route with respect to the next shot or subsequent shots.

The control unit 6 accesses the weather data acquisition unit 7 to acquire weather information at this time, and can thereby correct the optimal solution route on which the target score is more easily achieved.

These corrections are made also in a case where there is a difference between a total score of the player in the middle of the play at this point of time and an aggregate total of personal-PARs up to the point of time. Note that in a case where the target score cannot be achieved in the middle of the play, the optimal solution route that has been derived before the play may continue to be presented, or the target score may be corrected and re-input. This setting is made by the user.

That is, in derivation of the optimal solution and the optimal solution route during the play, when the player presses the number of strokes registration button 8 during the play, the control unit 6 that includes the correction unit 6a re-obtains an optimal solution at a position of this shot or positions of subsequent shots so that the target score can be achieved using positional information received by the GPS receiving unit 9 and weather information acquired by the weather data acquisition unit 7 such as a wind direction and a wind direction, and draws the optimal solution route on the display unit 2 based on the optimal solution.

Although not illustrated, the apparatus may alternatively re-derive the optimal solution route as follows. The positions of shots made by the player as the user during the play are stored in the storage device 14 as the positional information acquired from the GPS receiving unit 9. The control unit 6 calculates a carry during the user's play from these pieces of positional information. When recognizing that there is a difference between the calculated carry and data stored in the player data storage unit 4, the control unit 6 that includes the correction unit 6a corrects the optimal solution route in accordance with the user's carry recorded in the storage device 14 during the play, and re-derives the optimal solution route in accordance with the user's condition at a present point of time.

Furthermore, in a case where the target score is corrected during the play, pressing the power button 11 twice for a short period of time causes the control unit 6 to draw the menu screen on the display unit 2. When recognizing that the user selects an icon for correcting the target score during round from a displayed menu and inputs a corrected target score, the control unit 6 newly derives an optimal solution route in accordance with the corrected target score in the same method as that of deriving the optimal solution route before the play. It is preferable that the user can correct the target score and freely allocate the personal-PAR between shots and putts and between holes at any time of the play.

While the user plays with the aim of achieving the target score, it is preferable that he/she enjoys the play. The apparatus may record not only the user's scores, but also winning or losing with respect to an actual result at each hole after the user challenges the optimal solution derived for achieving the user's target score and displays the winning and losing as a match play system in the display area L1. That is, the match play system as illustrated in FIG. 12 is displayed in the display area L1.

With respect to the optimal solution route regarding shots corrected when the control unit 6 recognizes that the number of strokes registration button 8 is pressed by the user for a short period of time during the play, the control unit 6 preferably ends correction of the optimal solution route at a hole in a case where the user reaches the green via the GPS receiving unit 9.

In a case where the golf course data storage unit 3 includes terrain information of the green, and the control unit 6 recognizes that the user is on the green from data in the GPS receiving unit 9 such as pressing of the number of strokes registration button 8 for a short period of time on the green, the control unit 6 may alternatively derive an optimal solution route for putts on the green based on a personal-PAR at each hole and display the optimal solution route on the display unit 2. This display method may be performed like a commercialized golf game.

Note that in a case where the optimal solution route for putts is not derived, the player may input the number of putts from the display unit 2, or may press the number of strokes registration button 8 in accordance with the number of putts.

Figure 13:
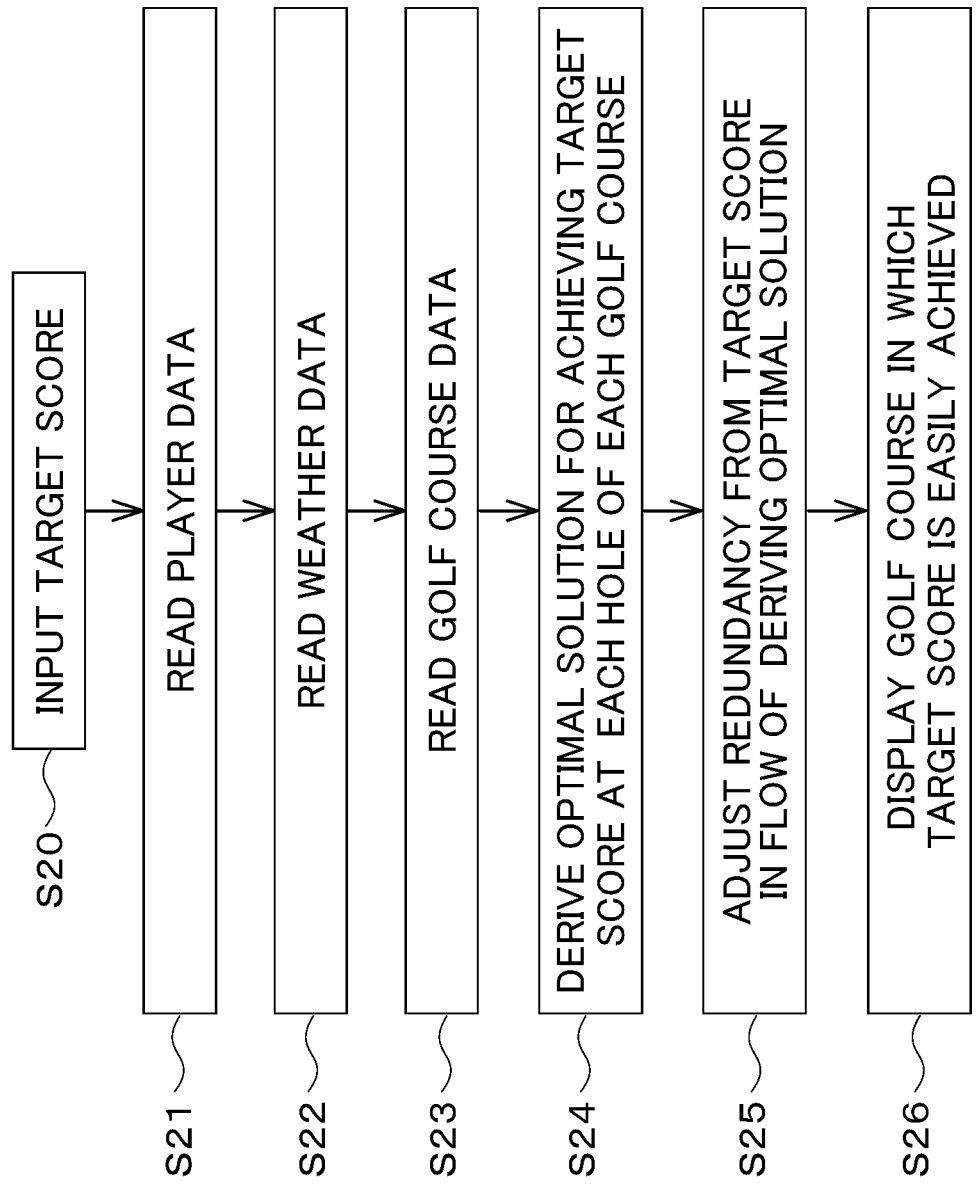
FIG. 13 is a flowchart for deriving a golf course appropriate for achieving a target score.

FIG. 13 illustrates other functions of the control unit 6 and is a flowchart for deriving a golf course appropriate for achieving the target score.

This flow includes a step of inputting a target score (S20), a step of reading player data (S21), a step of reading weather data (S22), a step of reading golf course data (S23), a step of deriving an optimal solution for achieving the target score at each hole of each golf course (S24), a step of adjusting a redundancy with respect to the target score in the flow of deriving the optimal solution (S25), and a step of displaying a golf course in which the target score is easily achieved (S26).

In the present embodiment, the golf course data storage unit 3 stores data of a plurality of golf courses, and the control unit 6 can select and present a candidate for a golf course that seems to enable achievement of the target score from the plurality of golf courses.

That is, the SEARCH FOR OPTIMAL COURSE icon drawn on the main menu screen on the display unit 2 is selected, and a target score that the user wants to achieve is input (S20).

When recognizing that the target score is input, the control unit 6 accesses the golf course data storage unit 3, the player data storage unit 4, and the weather data acquisition unit 7 (S21 to S23), and derives an optimal solution in accordance with the user's target score in each golf course (S24).

In this flow of calculation, the control unit 6 calculates a redundancy between an aggregate total of minimum numbers of shots and putts (better-personal-PARs) set or reset at the respective holes and the target score (S25). For example, in a case where the target score is 99, the aggregate total of better-personal-PARs for an A course is 89, the aggregate total of better-personal-PARs for a B course is 95, and the aggregate total of better-personal-PARs for a C course is 83, redundancies for the A courses, the B course, and the C course are 10, 4, and 16, respectively. The courses are arranged in descending order of redundancies, and the courses in which the target score is more easily achieved are indicated as permutations of C, A, and B (S26). FIG. 14 illustrates an example when a result of derivation is displayed.

That is, in derivation of a golf course in which the target score is easily achieved, when the player inputs the target score, the control unit 6 selects a golf course in which the target score can be achieved from a plurality of golf courses stored in the golf course data storage unit 3, and displays a result of the selection on the display unit 2.

Note that in a case where the control unit 6, when driving the optimal solution, determines that the target score cannot be physically achieved based on data regarding a carry recorded in the player data storage unit 4, the target score can be preferably re-input.

Listed golf courses in which the target score can be possibly achieved may be able to be displayed on a distance-by-distance basis centering on the user's present position (for example, within a radius range of 50 km).

Among the listed golf courses in which the target score can be possibly achieved, a course selected by the user is recorded in the storage device 14. When the control unit 6 recognizes that positional information acquired by the GPS receiving unit 9 is matched with a location of the golf course at the time of the user's playing in the golf course, the PLAY MODE may be automatically started without input of the target score or the like or without selection of the PLAY MODE on the main menu screen.

Figure 15:
FIG. 15 is a flowchart for deriving technical information for achieving the target score in a golf course.

FIG. 15 illustrates other functions of the control unit 6 and is a flowchart for deriving technical information for achieving the target score in the golf course.

This flow includes a step of calculating the flow of deriving the optimal solution S5-1 (S30), and a step of correcting the player's carry to make a redundancy "0" (S31), and a step of presenting carry information (S32).

That is, when the user, who wants to achieve the target score in a golf course stored in the golf course data storage unit 3, selects the TECHNICAL INFORMATION FOR EACH COURSE icon on the main menu, inputs the target score, and selects the golf course in which the user wants to achieve the target score, the control unit 6 recognizes the input, derives the user's maximum carry necessary for achieving the target score or the like from an attribute of the golf course, and displays the result on the display unit 2 (S32).

For example, in a case where the target score is input as 80, the control unit 6 performs calculation until the step S5-1 of calculating the flow of deriving the optimal solution to calculate a redundancy between the target score and the better-personal-PAR. In this calculation, the number of putts as the better-personal-PAR at each hole is fixed to 2. If the aggregate total of better-personal-PARs is 75, the redundancy is "5". If the aggregate total of better-personal-PARs is 82, the redundancy is "−2". In a case where the redundancy is "0" or greater, the control unit 6 presents carry information of the derived optimal solution route. In a case where the redundancy is "−(negative number)", the control unit corrects the player's carry so that the redundancy becomes "0". A known carry coefficient for each club is preferably used for this correction. The control unit 6 presents a correction amount of the calculated carry or a difference between the player's carry and the corrected carry to the user by indicating that, for example, a driver's necessary carry is 213 yards and a difference in carry is 15 yards.

In a case where the redundancy becomes "−(negative number)", the control unit 6 may present information of the better-personal-PARs to make the redundancy "0", or may perform display so as to correct the target score. The control unit 6 may also present, for example, data regarding shots, such as data indicating that eight times of shots of 100 to 150 yards, which the player is good at, are required, based on the derived carry information and the information in the player data storage unit 4.

An embodiment of a golf analysis assistance method according to the present invention will be described with reference to FIG. 7.

The golf analysis assistance method includes a step S1 of acquiring a target score that is set by the player for a golf course, a step S2 of acquiring an attribute of the player, a step S3 of acquiring weather data, a step S4 of acquiring an attribute of the golf course, a step S5 of obtaining an optimal solution for the player from making of a tee shot to dropping in the cup from the attribute of the player, the attribute of the golf course, and the weather data so that the target score can be achieved, and a step S6 of deriving and displaying an optimal solution route. This method is executed by the control unit 6.

The step S1 of acquiring the target score is performed by the user (player) selecting the OPTIMAL SOLUTION MODE icon or the PLAYER MODE icon on the main menu screen drawn on the display unit 2, and subsequently inputting the target score.

The step S2 of acquiring the attribute of the player includes a step S2-1 of inputting player data, a step S2-2 of reading detailed data, and a measurement step S2-3.

As the attribute information of the user is recorded in a more detailed manner, the more appropriate optimal solution route for achieving the target score desired by the player is presented. Thus, to present the optimal solution route more appropriately, it is preferable to include the step S2-2 in which the control unit 6 reads information of characteristics of shots and putts and the like stored in the player data storage unit 4 as necessary.

The measurement step S2-3 is a step of measuring and inputting information of swing speed or a shot ball.

The measurement step S2-3 is a step of, in a case where a user has never played before or does not know his/her carry, measuring information of swing speed or a shot ball and inputting the information as the attribute of the player. Information of swing speed measured by the microwave sensor 18 (head speed of a club) and information of a shot ball obtained by an external device having a measurement model using the Doppler effect can be used as player data via the wireless communication unit 16. In step S2-1, the player can input information of a carry with each club, head speed of each club, or the like. For example, in a case where the player feels that the ball flies less than usual when the weather data acquired by the weather data acquisition unit 7 indicates a temperature below zero, it is also possible to input a carry with each club by being reduced by 10%.

The step S3 of acquiring the weather data is a step of reading the weather data. In this step S3, the weather data acquisition unit 7 acquires the weather data announced by the meteorological agency or the like on a timely basis. Also before the play, for example, acquiring the weather data such as weekly weather forecast around a golf course scheduled to be played enables derivation of the optimal solution route in which the target score is more easily achieved.

The step S4 of acquiring the attribute of the golf course is a step of reading data such as a course layout of the golf course selected by the player from the golf course data storage unit 3.

The step S5 of obtaining the optimal solution includes a step S5-1 of setting the better-personal-PAR at each hole, a step S5-2 of correcting the better-personal-PAR from the player data, and a step S5-3 of setting the optimal solution (personal-PAR) at each hole from the better-personal-PAR based on the target score. The step S5 is a step of deriving the optimal solution, and is performed by the control unit 6 when, after the target score is input and the golf course is selected, the attribute of the player is input or being recorded.

The step S6 of deriving and displaying the optimal solution route is a step of displaying a screen as illustrated in FIG. 6 on the display unit 2.

That is, the control unit 6 visualizes, on the display unit 2, a route of a shot from the teeing area until the ball is put on the green, based on appropriate carry information at a hole to achieve the target score in accordance with the derived personal-PAR and club information in accordance with the carry and presents the route to the user.

The derived personal-PAR at each hole may be displayed (in the area L1) simultaneously with the display of the course layout on the display unit 2. A distance of a shot or a distance of a putt may be displayed together in the display area (FIG. 6 or the like). Information of a club type may be displayed together with the displayed distance (FIG. 6). The personal-PAR may be allocated between holes or between shots and putts in accordance with the player's characteristics. At the time of the allocation, a setting of whether to allocate the personal-PAR at each hole, which is derived by the control unit 6, automatically based on data in the player data storage unit 4 or by the user himself/herself is made by the user.

The golf analysis assistance apparatus according to the present embodiment is a golf analysis assistance apparatus that lists golf courses in which a target score set by the user is easily achieved as an optimal index for achieving the target score sought by the user, displays carry information necessary for achieving the target score set by the user in a golf course desired to be played, displays an optimal solution route for achieving the target score sought by the user on a course layout of an actual golf course, measures a present position, and makes notification of the present position, a distance to the middle of the green, or the like in real time with the movement of the user. While an apparatus that displays the actual golf course on the course layout, measures the present position, and makes notification of the present position, a remaining distance to the green, or the like in real time with the movement of the player is also called as a golf navigation apparatus or the like in a broad sense, the golf analysis assistance apparatus according to the present invention can be also called as a golf assistance apparatus having functions of the golf navigation apparatus in the broad sense.

Note that the present invention includes the golf analysis assistance apparatus, or a golf analysis assistance program that causes a computer to execute, function as, or implement procedures, means, and functions of the golf analysis assistance method.

This program is used as an application for a smartphone or a personal computer (PC). The smartphone, the PC, or the like in which this application is installed constitutes the golf analysis assistance apparatus according to the present invention.

Figure 16:
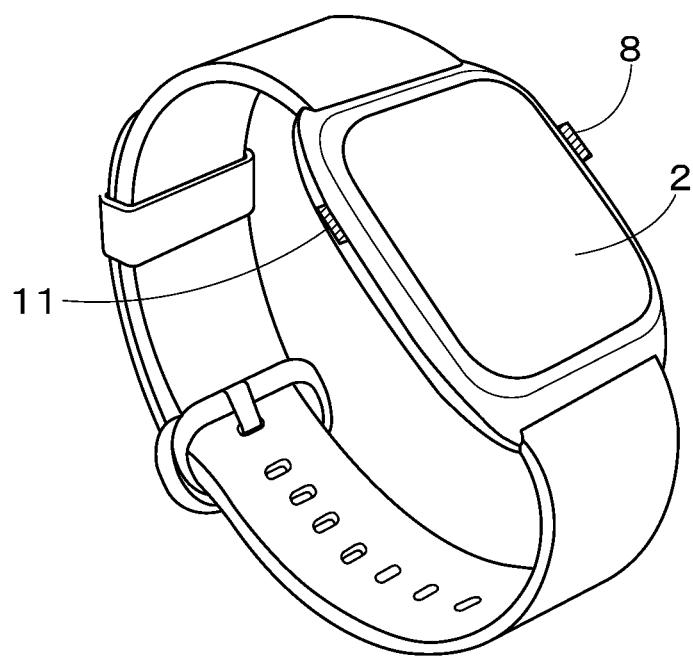
FIG. 16 is a perspective view of a golf analysis assistance apparatus according to another embodiment of the present invention.

The embodiments disclosed herein are merely examples in all respects, and are not limitative. For example, the main body may be of a wristwatch-type as illustrated in FIG. 16. In addition, the golf analysis assistance apparatus is preferably installed in a golf cart so that it can be utilized by many users. Furthermore, the golf analysis assistance apparatus is preferably provided as an application so that it can be used with an electronic terminal of an individual person.

A conventional golf navigation system merely presents a plurality of conquering methods in a golf course regardless of the player's target score, but the present invention provides a system of deriving and presenting an optimal solution for conquering to achieve the player's target score, correcting the optimal solution during play in accordance with a situation, and deriving and presenting a new optimal solution.

The scope of the present invention is represented not by the above description but by the claims, and all modifications are included in a sense equivalent to the claims and within the scope of the claims.

What is claimed is:

1. A golf analysis assistance apparatus, comprising:
an input/output unit;
a first memory connected to a microprocessor and storing attribute data of a golf course;
a second memory connected to the microprocessor and storing attribute data of a player;
the microprocessor configured or programmed to obtain a target score on the entire golf course that is set by the player, and control the input/output unit, the first and second memories,
wherein the attribute data of the golf course includes two-dimensional layout information and three-dimensional layout information of the golf course and positional information of one or more objects on the golf course including a green and/or a hazard,
wherein the attribute data of the player includes data regarding a carry obtained using each of golf clubs for use by the player and head speed of each of the golf clubs and content of previous play of the player,
wherein the microprocessor is configured or programmed to (i) based on the target score and the attribute data in the first and second memories, determine an optimal solution for the player on each of holes from a tee shot to a final putt and a route to the optimal solution from the tee shot to the final putt so that the target score is achieved and (ii) output the optimal solution and the route to the optimum solution to the input/output unit,
wherein the optimal solution is a subtotal of the number of shots to reach the green and the number of putts on the green on each of the holes determined based on the attribute data in the first and second memories so that the sum of the subtotals on the holes matches the target score,
wherein the route to the optimal solution is comprised of a route including presenting a recommended type of golf club and a carry obtained using the recommended type of golf club for achieving the number of shots, and
wherein the input/output unit includes a display screen controlled by the microprocessor to display:
a plan view and a height difference view of each hole of the golf course,
a trajectory of the route of the optimal solution respectively superimposing over the plan view and the height difference view of each hole of the golf course, including at least one distance along with the recommended type of golf club for said at least one distance, and
a display area including the optimal solution for each of shots and putts at each hole and a number of strokes made by the player to be input by the player.

2. The golf analysis assistance apparatus according to claim 1, further comprising:
a number-of-strokes registration unit to register the number of strokes; and
a GPS receiving unit to receive a GPS signal,
wherein the microprocessor is further configured to:
obtain weather data regarding a wind direction and/or a wind speed in the golf course,
correct the route to the optimal solution using the weather data, the number-of-strokes registration unit, and the GPS receiving unit, and
redetermine an optimal solution for the rest of a corresponding one of the holes from a position at which a shot was made during play so that the target score is achieved.

3. The golf analysis assistance apparatus according to claim 1,
wherein the first memory stores data of a plurality of the golf courses, and
wherein the microprocessor is configured or programmed to allow selection of a golf course in which the target score is achievable from the plurality of golf courses.

4. The golf analysis assistance apparatus according to claim 2,
wherein the first memory stores data of a plurality of the golf courses, and wherein the microprocessor is configured or programmed to allow selection of a golf course in which the target score is achievable from the plurality of golf courses.

5. A golf analysis assistance method performed by using a golf analysis assistance apparatus comprising:
an input/output unit;
a first memory connected to a microprocessor and storing attribute data of a golf course;
a second memory connected to the microprocessor and storing attribute data of a player;
the microprocessor configured or programmed to obtain a target score on the entire golf course that is set by the player, and control the input/output unit, the first and second memories,
wherein the attribute data of the golf course includes two-dimensional layout information and three-dimensional layout information of the golf course and positional information of one or more objects on the golf course including a green and/or a hazard,
wherein the attribute data of the player includes data regarding a carry obtained using each of golf clubs for use by the player and head speed of each of the golf clubs and content of previous play of the player,
wherein the microprocessor is configured or programmed to (i) based on the target score and the attribute data in the first and second memories, determine an optimal solution for the player on each of holes from a tee shot to a final putt and a route to the optimal solution from the tee shot to the final putt so that the target score is achieved and (ii) output the optimal solution and the route to the optimum solution to the input/output unit,
wherein the optimal solution is a subtotal of the number of shots to reach the green and the number of putts on the green on each of the holes determined based on the attribute data in the first and second memories so that the sum of the subtotals on the holes matches the target score,
wherein the route to the optimal solution is comprised of a route including presenting a recommended type of golf club and a carry obtained using the recommended type of golf club for achieving the number of shots, and
wherein the input/output unit includes a display screen controlled by the microprocessor to display:
a plan view and a height difference view of each hole of the golf course,
a trajectory of the route of the optimal solution respectively superimposing over the plan view and the height difference view of each hole of the golf course, including at least one distance along with the recommended type of golf club for said at least one distance, and
a display area including the optimal solution for each of shots and putts at each hole and a number of strokes made by the player to be input by the player,
the method comprising:
acquiring a target score on an entire golf course, the target score being set by a player;
acquiring an attribute of the player;
acquiring weather data;
acquiring an attribute of the golf course;
determining a route to an optimal solution from a tee shot to a final putt on each of holes of the golf course from the attribute of the player, the attribute of the golf course, and the weather data so that the target score is achieved; and
displaying the route to the optimal solution.

6. A non-volatile and non-transitory computer-readable storage medium which stores a golf analysis assistance program causing a computer to function as a golf analysis assistance apparatus comprising:
an input/output unit;
a first memory connected to a microprocessor and storing attribute data of a golf course;
a second memory connected to the microprocessor and storing attribute data of a player;
the microprocessor configured or programmed to obtain a target score on the entire golf course that is set by the player, and control the input/output unit, the first and second memories,
wherein the attribute data of the golf course includes two-dimensional layout information and three-dimensional layout information of the golf course and positional information of one or more objects on the golf course including a green and/or a hazard,
wherein the attribute data of the player includes data regarding a carry obtained using each of golf clubs for use by the player and head speed of each of the golf clubs and content of previous play of the player,
wherein the microprocessor is configured or programmed to (i) based on the target score and the attribute data in the first and second memories, determine an optimal solution for the player on each of holes from a tee shot to a final putt and a route to the optimal solution from the tee shot to the final putt so that the target score is achieved and (ii) output the optimal solution and the route to the optimum solution to the input/output unit,
wherein the optimal solution is a subtotal of the number of shots to reach the green and the number of putts on the green on each of the holes determined based on the attribute data in the first and second memories so that the sum of the subtotals on the holes matches the target score,
wherein the route to the optimal solution is comprised of a route including presenting a recommended type of golf club and a carry obtained using the recommended type of golf club for achieving the number of shots, and
wherein the input/output unit includes a display screen controlled by the microprocessor to display:
a plan view and a height difference view of each hole of the golf course,
a trajectory of the route of the optimal solution respectively superimposing over the plan view and the height difference view of each hole of the golf course, including at least one distance along with the recommended type of golf club for said at least one distance, and
a display area including the optimal solution for each of shots and putts at each hole and a number of strokes made by the player to be input by the player.

7. The non-volatile and non-transitory computer-readable storage medium according to claim 6, wherein the golf analysis assistance apparatus further comprises:
a number-of-strokes registration unit to register the number of strokes; and
a GPS receiving unit to receive a GPS signal, and
wherein the microprocessor is further configured to:
obtain weather data regarding a wind direction and/or a wind speed in the golf course,
correct the route to the optimal solution using the weather data, the number-of-strokes registration unit, and the GPS receiving unit, and redetermine an optimal solution for the rest of a corresponding one of the holes from a position at which a shot was made during play so that the target score is achieved.

8. The non-volatile and non-transitory computer-readable storage medium according to claim 6, wherein the first memory stores data of a plurality of the golf courses, and wherein the microprocessor is configured or programmed to allow selection of a golf course in which the target score is achievable from the plurality of golf courses.

* * * * *